United States Patent
Nielson

(10) Patent No.: US 12,440,652 B2
(45) Date of Patent: Oct. 14, 2025

(54) INTRAVENOUS CATHETER-PLACEMENT DEVICE AND METHOD THEREOF

(71) Applicant: Bard Peripheral Vascular, Inc., Franklin Lakes, NJ (US)

(72) Inventor: Chad K. Nielson, Midvale, UT (US)

(73) Assignee: Bard Peripheral Vascular, Inc., Franklin Lakes, NJ (US)

( * ) Notice: Subject to any disclaimer, the term of this patent is extended or adjusted under 35 U.S.C. 154(b) by 763 days.

(21) Appl. No.: 17/761,588

(22) PCT Filed: Sep. 20, 2019

(86) PCT No.: PCT/US2019/052225
§ 371 (c)(1),
(2) Date: Mar. 17, 2022

(87) PCT Pub. No.: WO2021/054980
PCT Pub. Date: Mar. 25, 2021

(65) Prior Publication Data
US 2022/0379093 A1    Dec. 1, 2022

(51) Int. Cl.
*A61M 25/06* (2006.01)
*A61M 5/32* (2006.01)
*A61M 25/01* (2006.01)

(52) U.S. Cl.
CPC .... *A61M 25/0606* (2013.01); *A61M 25/0113* (2013.01); *A61M 25/0631* (2013.01);
(Continued)

(58) Field of Classification Search
CPC ............ A61M 25/063; A61M 25/0612; A61M 25/0618; A61M 25/0606; A61M 25/0631;
(Continued)

(56) References Cited

U.S. PATENT DOCUMENTS 2,211,975 A    8/1940    Hendrickson
2,259,488 A    10/1941   Raiche
(Continued)

FOREIGN PATENT DOCUMENTS

AU    691141 B2    5/1998
AU    710967 B2    9/1999
(Continued)

OTHER PUBLICATIONS

Access Scientific, The PICC Wand® Product Data Sheet, Revision F, May 22, 2012.
(Continued)

*Primary Examiner* — William R Carpenter
*Assistant Examiner* — Robert F Allen
(74) *Attorney, Agent, or Firm* — Rutan & Tucker LLP

(57) ABSTRACT

An IV catheter-placement device and method thereof. The IV catheter-placement device can include a cartridge and a case fixedly disposed over the cartridge. The cartridge can include a barrel having a release button, a spring-loaded needle extending from the barrel, and an IV catheter including a catheter hub slidably disposed over the needle. The case can include a deployment button configured to slide the IV catheter over the needle. The deployment button can also be configured to press the release button when the deployment button slides into the release button. A spring compressed between a needle hub and a distal-end portion of the barrel can be released when the deployment button slides into the release button. An entirety of the needle is subsequently launched into a needle cavity of the barrel.

21 Claims, 4 Drawing Sheets

(52) U.S. Cl.
CPC . *A61M 25/0693* (2013.01); *A61M 2005/3228* (2013.01); *A61M 5/3232* (2013.01); *A61M 5/3234* (2013.01); *A61M 5/3257* (2013.01); *A61M 5/326* (2013.01); *A61M 25/0612* (2013.01); *A61M 25/0618* (2013.01)

(58) Field of Classification Search
CPC .......... A61M 25/0113; A61M 25/0693; A61M 5/3232; A61M 5/3234; A61M 5/3257; A61M 5/326; A61M 2005/3228
See application file for complete search history.

(56) References Cited

U.S. PATENT DOCUMENTS

| | | |
|---|---|---|
| 2,330,400 A | 9/1943 | Winder |
| D138,589 S | 8/1944 | Brandenburg |
| 3,185,151 A | 5/1965 | Czorny |
| 3,297,030 A | 1/1967 | Czorny et al. |
| 3,416,567 A | 12/1968 | von Dardel et al. |
| 3,469,579 A | 9/1969 | Hubert |
| 3,500,828 A | 3/1970 | Podhora |
| 3,552,384 A | 1/1971 | Pierie et al. |
| 3,572,334 A | 3/1971 | Petterson |
| 3,585,996 A | 6/1971 | Reynolds et al. |
| 3,589,361 A | 6/1971 | Loper et al. |
| 3,592,192 A | 7/1971 | Harautuneian |
| 3,595,230 A | 7/1971 | Suyeoka et al. |
| 3,610,240 A | 10/1971 | Harautuneian |
| 3,682,173 A | 8/1972 | Center |
| 3,766,916 A | 10/1973 | Moorehead et al. |
| 3,884,242 A | 5/1975 | Bazell et al. |
| 3,921,631 A | 11/1975 | Thompson |
| 3,995,628 A | 12/1976 | Gula et al. |
| 4,027,668 A | 6/1977 | Dunn |
| 4,037,600 A | 7/1977 | Poncy et al. |
| 4,079,738 A | 3/1978 | Dunn et al. |
| 4,106,506 A | 8/1978 | Koehn et al. |
| 4,177,809 A | 12/1979 | Moorehead |
| 4,292,970 A | 10/1981 | Hession, Jr. |
| 4,317,445 A | 3/1982 | Robinson |
| 4,345,602 A | 8/1982 | Yoshimura et al. |
| 4,354,491 A | 10/1982 | Marbry |
| 4,368,730 A | 1/1983 | Sharrock |
| 4,387,879 A | 6/1983 | Tauschinski |
| 4,417,886 A | 11/1983 | Frankhouser et al. |
| 4,449,693 A | 5/1984 | Gereg |
| 4,456,017 A | 6/1984 | Miles |
| 4,464,171 A | 8/1984 | Garwin |
| 4,509,534 A | 4/1985 | Tassin, Jr. |
| 4,509,945 A | 4/1985 | Kramann et al. |
| 4,511,359 A | 4/1985 | Vaillancourt |
| 4,512,766 A | 4/1985 | Vailancourt |
| 4,525,157 A | 6/1985 | Vaillancourt |
| 4,581,019 A | 4/1986 | Curelaru et al. |
| 4,585,440 A | 4/1986 | Tchervenkov et al. |
| D287,877 S | 1/1987 | Holewinski et al. |
| 4,728,322 A | 3/1988 | Walker et al. |
| 4,738,659 A | 4/1988 | Sleiman |
| 4,747,831 A | 5/1988 | Kulli |
| 4,767,407 A | 8/1988 | Foran |
| 4,767,408 A | 8/1988 | McFarlane |
| 4,772,264 A | 9/1988 | Cragg |
| 4,772,267 A | 9/1988 | Brown |
| 4,781,703 A | 11/1988 | Walker et al. |
| 4,792,531 A | 12/1988 | Kakihana |
| 4,798,193 A | 1/1989 | Giesy et al. |
| 4,813,934 A | 3/1989 | Engelson et al. |
| 4,826,070 A | 5/1989 | Kakihana |
| 4,828,547 A | 5/1989 | Sahi et al. |
| 4,834,708 A | 5/1989 | Pillari |
| 4,834,718 A | 5/1989 | McDonald |
| 4,840,613 A | 6/1989 | Balbierz |
| 4,840,622 A | 6/1989 | Hardy |
| 4,842,591 A | 6/1989 | Luther |
| 4,846,812 A | 7/1989 | Walker et al. |
| 4,850,961 A | 7/1989 | Wanderer et al. |
| 4,860,757 A | 8/1989 | Lynch et al. |
| 4,863,431 A | 9/1989 | Vaillancourt |
| 4,869,259 A | 9/1989 | Elkins |
| D304,079 S | 10/1989 | McFarlane |
| 4,871,358 A | 10/1989 | Gold |
| 4,874,377 A | 10/1989 | Newgard et al. |
| 4,883,461 A | 11/1989 | Sawyer |
| 4,883,699 A | 11/1989 | Aniuk et al. |
| 4,894,052 A | 1/1990 | Crawford |
| 4,895,346 A | 1/1990 | Steigerwald |
| 4,900,307 A | 2/1990 | Kulli |
| 4,906,956 A | 3/1990 | Kakihana |
| 4,908,021 A | 3/1990 | McFarlane |
| 4,909,793 A | 3/1990 | Vining et al. |
| 4,911,691 A | 3/1990 | Aniuk et al. |
| 4,913,704 A | 4/1990 | Kurimoto |
| 4,917,102 A | 4/1990 | Miller et al. |
| 4,917,668 A | 4/1990 | Haindl |
| 4,917,671 A | 4/1990 | Chang |
| 4,929,235 A | 5/1990 | Merry et al. |
| 4,935,010 A | 6/1990 | Cox et al. |
| 4,944,725 A | 7/1990 | McDonald |
| 4,944,728 A | 7/1990 | Carrell et al. |
| 4,955,863 A | 9/1990 | Walker et al. |
| 4,961,729 A | 10/1990 | Vaillancourt |
| 4,966,586 A | 10/1990 | Vaillancourt |
| 4,966,589 A | 10/1990 | Kaufman |
| 4,994,042 A | 2/1991 | Vadher |
| 4,994,047 A | 2/1991 | Walker et al. |
| 4,995,866 A | 2/1991 | Amplatz et al. |
| 5,007,901 A | 4/1991 | Shields |
| 5,009,642 A | 4/1991 | Sahi |
| 5,019,048 A | 5/1991 | Margolin |
| 5,019,049 A | 5/1991 | Haining |
| D318,733 S | 7/1991 | Wyzgala |
| 5,034,347 A | 7/1991 | Kakihana |
| 5,047,013 A | 9/1991 | Rossdeutscher |
| D321,250 S | 10/1991 | Jepson et al. |
| 5,053,014 A | 10/1991 | Van Heugten |
| 5,054,501 A | 10/1991 | Chuttani et al. |
| 5,061,254 A | 10/1991 | Karakelle et al. |
| 5,064,416 A | 11/1991 | Newgard et al. |
| 5,078,694 A | 1/1992 | Wallace |
| 5,078,696 A | 1/1992 | Nedbaluk |
| 5,078,702 A | 1/1992 | Pomeranz |
| 5,084,023 A | 1/1992 | Lemieux |
| 5,085,645 A | 2/1992 | Purdy et al. |
| 5,088,984 A | 2/1992 | Fields |
| 5,093,692 A | 3/1992 | Su et al. |
| 5,098,392 A | 3/1992 | Fleischhacker et al. |
| 5,098,395 A | 3/1992 | Fields |
| 5,098,396 A | 3/1992 | Taylor et al. |
| 5,098,405 A | 3/1992 | Peterson et al. |
| 5,108,375 A | 4/1992 | Harrison et al. |
| 5,108,376 A | 4/1992 | Bonaldo |
| 5,112,312 A | 5/1992 | Luther |
| 5,116,323 A | 5/1992 | Kreuzer et al. |
| 5,120,317 A | 6/1992 | Luther |
| 5,125,906 A | 6/1992 | Fleck |
| 5,135,487 A | 8/1992 | Morrill et al. |
| 5,137,515 A | 8/1992 | Hogan |
| 5,149,326 A | 9/1992 | Woodgrift et al. |
| 5,154,703 A | 10/1992 | Bonaldo |
| 5,156,590 A | 10/1992 | Vilmar |
| 5,156,596 A | 10/1992 | Balbierz et al. |
| 5,158,544 A | 10/1992 | Weinstein |
| 5,167,637 A | 12/1992 | Okada et al. |
| 5,176,650 A | 1/1993 | Haining |
| 5,186,168 A | 2/1993 | Spofford et al. |
| 5,186,712 A | 2/1993 | Kelso et al. |
| 5,188,607 A | 2/1993 | Wu |
| 5,190,528 A | 3/1993 | Fonger et al. |
| 5,192,301 A | 3/1993 | Kamiya et al. |
| 5,195,974 A | 3/1993 | Hardy |
| 5,195,980 A | 3/1993 | Catlin |
| 5,195,985 A | 3/1993 | Hall |
| 5,205,830 A | 4/1993 | Dassa et al. |

(56) References Cited

U.S. PATENT DOCUMENTS

| | | | |
|---|---|---|---|
| 5,215,527 A | 6/1993 | Beck et al. | |
| 5,215,528 A | 6/1993 | Purdy et al. | |
| 5,217,435 A | 6/1993 | Kring | |
| 5,219,335 A | 6/1993 | Willard et al. | |
| 5,221,255 A | 6/1993 | Mahurkar et al. | |
| 5,222,944 A | 6/1993 | Harris | |
| 5,225,369 A | 7/1993 | Su et al. | |
| 5,226,899 A | 7/1993 | Lee et al. | |
| D338,955 S | 8/1993 | Gresl et al. | |
| 5,234,410 A | 8/1993 | Graham et al. | |
| 5,242,411 A | 9/1993 | Yamamoto et al. | |
| 5,246,426 A | 9/1993 | Lewis et al. | |
| 5,246,430 A | 9/1993 | MacFarlane | |
| 5,254,107 A | 10/1993 | Soltesz | |
| 5,257,980 A | 11/1993 | Van Antwerp et al. | |
| 5,267,982 A | 12/1993 | Sylvanowicz | |
| 5,269,771 A | 12/1993 | Thomas et al. | |
| D345,419 S | 3/1994 | Horrigan et al. | |
| 5,290,310 A | 3/1994 | Makower et al. | |
| 5,297,546 A | 3/1994 | Spofford et al. | |
| 5,312,359 A | 5/1994 | Wallace | |
| 5,312,361 A | 5/1994 | Zadini et al. | |
| 5,312,363 A | 5/1994 | Ryan et al. | |
| 5,318,541 A | 6/1994 | Viera et al. | |
| 5,320,608 A | 6/1994 | Gerrone | |
| 5,322,517 A | 6/1994 | Sircom et al. | |
| 5,330,435 A | 7/1994 | Vaillancourt | |
| 5,334,159 A | 8/1994 | Turkel | |
| 5,338,311 A | 8/1994 | Mahurkar | |
| 5,352,205 A | 10/1994 | Dales et al. | |
| 5,358,796 A | 10/1994 | Nakamura et al. | |
| 5,366,441 A | 11/1994 | Crawford | |
| 5,368,661 A | 11/1994 | Nakamura et al. | |
| D353,668 S | 12/1994 | Banks et al. | |
| 5,376,082 A | 12/1994 | Phelps | |
| 5,376,094 A | 12/1994 | Kline | |
| 5,380,290 A | 1/1995 | Makower et al. | |
| 5,380,292 A | 1/1995 | Wilson | |
| 5,395,341 A | 3/1995 | Slater | |
| 5,397,311 A | 3/1995 | Walker et al. | |
| 5,405,323 A | 4/1995 | Rogers et al. | |
| 5,415,177 A | 5/1995 | Zadini et al. | |
| 5,415,645 A | 5/1995 | Friend et al. | |
| 5,419,766 A | 5/1995 | Chang et al. | |
| 5,419,777 A | 5/1995 | Hofling | |
| 5,423,760 A | 6/1995 | Yoon | |
| 5,425,718 A * | 6/1995 | Tay | A61M 25/0643 604/164.11 |
| 5,431,506 A | 7/1995 | Masunaga | |
| 5,439,449 A | 8/1995 | Mapes et al. | |
| 5,445,625 A | 8/1995 | Voda | |
| 5,454,785 A | 10/1995 | Smith | |
| 5,454,790 A | 10/1995 | Dubrul | |
| 5,456,258 A | 10/1995 | Kondo et al. | |
| 5,456,668 A | 10/1995 | Ogle, II | |
| 5,458,658 A | 10/1995 | Sircom | |
| 5,466,230 A | 11/1995 | Davila | |
| 5,480,389 A | 1/1996 | McWha et al. | |
| 5,482,395 A | 1/1996 | Gasparini | |
| 5,484,419 A | 1/1996 | Fleck | |
| 5,487,734 A | 1/1996 | Thorne et al. | |
| 5,489,273 A | 2/1996 | Whitney et al. | |
| 5,496,281 A | 3/1996 | Krebs | |
| 5,501,671 A | 3/1996 | Rosen et al. | |
| 5,501,675 A * | 3/1996 | Erskine | A61M 25/0631 604/164.12 |
| 5,507,300 A | 4/1996 | Mukai et al. | |
| 5,512,052 A | 4/1996 | Jesch | |
| 5,514,108 A | 5/1996 | Stevens | |
| 5,520,655 A | 5/1996 | Davila et al. | |
| 5,520,657 A | 5/1996 | Sellers et al. | |
| D371,195 S | 6/1996 | Krebs | |
| 5,522,807 A | 6/1996 | Luther | |
| 5,527,290 A | 6/1996 | Zadini et al. | |
| 5,527,291 A | 6/1996 | Zadini et al. | |
| 5,531,701 A | 7/1996 | Luther | |
| 5,531,713 A | 7/1996 | Mastronardi et al. | |
| 5,533,988 A | 7/1996 | Dickerson et al. | |
| 5,535,785 A | 7/1996 | Werge et al. | |
| 5,542,933 A | 8/1996 | Marks | |
| 5,554,136 A | 9/1996 | Luther | |
| 5,562,629 A | 10/1996 | Haughton et al. | |
| 5,562,630 A | 10/1996 | Nichols | |
| 5,562,631 A | 10/1996 | Bogert | |
| 5,562,633 A | 10/1996 | Wozencroft | |
| 5,562,634 A | 10/1996 | Flumene et al. | |
| 5,569,202 A | 10/1996 | Kovalic et al. | |
| 5,569,217 A | 10/1996 | Luther | |
| 5,571,073 A | 11/1996 | Castillo | |
| 5,573,510 A | 11/1996 | Isaacson | |
| 5,575,777 A * | 11/1996 | Cover | A61M 25/0606 604/110 |
| 5,591,194 A | 1/1997 | Berthiaume | |
| 5,599,291 A | 2/1997 | Balbierz et al. | |
| 5,599,327 A | 2/1997 | Sugahara et al. | |
| 5,609,583 A | 3/1997 | Hakki et al. | |
| 5,613,663 A | 3/1997 | Schmidt et al. | |
| 5,613,954 A | 3/1997 | Nelson et al. | |
| 5,630,802 A | 5/1997 | Moellmann et al. | |
| 5,630,823 A | 5/1997 | Schmitz-Rode et al. | |
| 5,634,475 A | 6/1997 | Wolvek | |
| 5,634,913 A | 6/1997 | Stinger | |
| 5,637,091 A | 6/1997 | Hakky et al. | |
| 5,645,076 A | 7/1997 | Yoon | |
| 5,651,772 A | 7/1997 | Arnett | |
| D383,538 S | 9/1997 | Erskine et al. | |
| 5,662,622 A | 9/1997 | Gore et al. | |
| 5,674,241 A | 10/1997 | Bley et al. | |
| 5,676,658 A | 10/1997 | Erskine | |
| 5,683,368 A | 11/1997 | Schmidt | |
| 5,683,370 A | 11/1997 | Luther et al. | |
| 5,685,855 A * | 11/1997 | Erskine | A61M 25/0693 604/110 |
| 5,685,858 A | 11/1997 | Kawand | |
| 5,685,860 A | 11/1997 | Chang et al. | |
| 5,688,249 A | 11/1997 | Chang et al. | |
| 5,693,025 A | 12/1997 | Stevens | |
| 5,695,474 A | 12/1997 | Daugherty | |
| 5,697,914 A | 12/1997 | Brimhall | |
| 5,700,250 A | 12/1997 | Erskine | |
| 5,702,367 A | 12/1997 | Cover et al. | |
| 5,702,369 A | 12/1997 | Mercereau | |
| 5,704,914 A | 1/1998 | Stocking et al. | |
| 5,722,425 A | 3/1998 | Bostrom | |
| 5,725,503 A | 3/1998 | Arnett | |
| 5,730,150 A | 3/1998 | Peppel et al. | |
| 5,730,733 A | 3/1998 | Mortier et al. | |
| 5,730,741 A | 3/1998 | Horzewski et al. | |
| 5,738,144 A | 4/1998 | Rogers | |
| 5,738,660 A | 4/1998 | Luther | |
| 5,743,882 A | 4/1998 | Luther | |
| 5,743,888 A | 4/1998 | Wilkes et al. | |
| 5,749,371 A | 5/1998 | Zadini et al. | |
| 5,749,857 A * | 5/1998 | Cuppy | A61M 25/0606 604/161 |
| 5,749,861 A | 5/1998 | Guala et al. | |
| 5,750,741 A | 5/1998 | Crocker et al. | |
| 5,755,693 A | 5/1998 | Walker et al. | |
| 5,755,709 A | 5/1998 | Cuppy | |
| 5,762,630 A | 6/1998 | Bley et al. | |
| 5,762,636 A | 6/1998 | Rupp et al. | |
| 5,765,682 A | 6/1998 | Bley et al. | |
| 5,779,679 A | 7/1998 | Shaw | |
| 5,779,680 A | 7/1998 | Yoon | |
| 5,779,681 A | 7/1998 | Bonn | |
| 5,782,807 A | 7/1998 | Falvai et al. | |
| D397,434 S | 8/1998 | Pike | |
| 5,792,124 A | 8/1998 | Horrigan et al. | |
| 5,797,880 A * | 8/1998 | Erskine | A61M 25/0631 604/110 |
| 5,800,395 A | 9/1998 | Botich et al. | |
| 5,807,339 A | 9/1998 | Bostrom et al. | |
| 5,807,342 A | 9/1998 | Musgrave et al. | |
| 5,807,350 A | 9/1998 | Diaz | |

(56) References Cited

U.S. PATENT DOCUMENTS

| | | |
|---|---|---|
| 5,810,780 A | 9/1998 | Brimhall et al. |
| 5,810,835 A | 9/1998 | Ryan et al. |
| 5,813,411 A | 9/1998 | Van Bladel et al. |
| 5,817,058 A | 10/1998 | Shaw |
| 5,817,069 A | 10/1998 | Arnett |
| 5,824,001 A | 10/1998 | Erskine |
| 5,827,202 A | 10/1998 | Miraki et al. |
| 5,827,221 A | 10/1998 | Phelps |
| 5,827,227 A | 10/1998 | DeLago |
| 5,830,190 A | 11/1998 | Howell |
| 5,830,224 A | 11/1998 | Cohn et al. |
| 5,839,470 A | 11/1998 | Hiejima et al. |
| 5,843,002 A | 12/1998 | Pecor et al. |
| 5,843,038 A | 12/1998 | Bailey |
| 5,846,259 A | 12/1998 | Berthiaume |
| 5,851,196 A | 12/1998 | Arnett |
| 5,853,393 A | 12/1998 | Bogert |
| 5,855,615 A | 1/1999 | Bley et al. |
| 5,858,002 A | 1/1999 | Jesch |
| 5,865,806 A | 2/1999 | Howell |
| 5,873,864 A | 2/1999 | Luther et al. |
| 5,879,332 A | 3/1999 | Schwemberger et al. |
| 5,879,337 A | 3/1999 | Kuracina et al. |
| 5,885,217 A | 3/1999 | Gisselberg et al. |
| 5,885,251 A | 3/1999 | Luther |
| 5,891,098 A | 4/1999 | Huang |
| 5,891,105 A | 4/1999 | Mahurkar |
| 5,895,398 A | 4/1999 | Wensel et al. |
| 5,902,274 A | 5/1999 | Yamamoto et al. |
| 5,902,832 A | 5/1999 | Van Bladel et al. |
| 5,911,705 A | 6/1999 | Howell |
| 5,911,710 A | 6/1999 | Barry et al. |
| 5,913,848 A | 6/1999 | Luther et al. |
| 5,916,208 A | 6/1999 | Luther et al. |
| 5,928,199 A | 7/1999 | Nakagami |
| D413,382 S | 8/1999 | Maissami |
| 5,935,110 A | 8/1999 | Brimhall |
| 5,941,854 A | 8/1999 | Bhitiyakul |
| 5,944,690 A | 8/1999 | Falwell et al. |
| 5,947,930 A | 9/1999 | Schwemberger et al. |
| 5,951,520 A | 9/1999 | Burzynski et al. |
| 5,954,698 A | 9/1999 | Pike |
| 5,957,893 A | 9/1999 | Luther et al. |
| 5,964,744 A | 10/1999 | Balbierz et al. |
| 5,967,490 A | 10/1999 | Pike |
| 5,984,895 A | 11/1999 | Padilla et al. |
| 5,984,903 A | 11/1999 | Nadal |
| 5,989,220 A | 11/1999 | Shaw et al. |
| 5,989,271 A | 11/1999 | Bonnette et al. |
| 5,997,507 A | 12/1999 | Dysarz |
| 5,997,510 A | 12/1999 | Schwemberger |
| 6,001,080 A | 12/1999 | Kuracina et al. |
| 6,004,278 A | 12/1999 | Botich et al. |
| 6,004,294 A | 12/1999 | Brimhall et al. |
| 6,004,295 A | 12/1999 | Langer et al. |
| 6,011,988 A | 1/2000 | Lynch et al. |
| 6,019,736 A | 2/2000 | Avellanet et al. |
| 6,022,319 A | 2/2000 | Willard et al. |
| 6,024,727 A | 2/2000 | Thorne et al. |
| 6,024,729 A | 2/2000 | Dehdashtian et al. |
| 6,045,734 A | 4/2000 | Luther et al. |
| 6,056,726 A | 5/2000 | Isaacson |
| 6,059,484 A | 5/2000 | Greive |
| 6,066,100 A | 5/2000 | Willard et al. |
| 6,074,378 A | 6/2000 | Mouri et al. |
| 6,077,244 A * | 6/2000 | Botich ............ A61M 25/0631 604/110 |
| 6,080,137 A | 6/2000 | Pike |
| 6,083,237 A | 7/2000 | Huitema et al. |
| 6,090,078 A * | 7/2000 | Erskine ............ A61M 25/0631 604/230 |
| 6,096,004 A | 8/2000 | Meglan et al. |
| 6,096,005 A | 8/2000 | Botich et al. |
| 6,109,264 A | 8/2000 | Sauer |
| 6,117,108 A | 9/2000 | Woehr et al. |
| 6,120,494 A | 9/2000 | Jonkman |
| 6,126,633 A | 10/2000 | Kaji et al. |
| 6,126,641 A | 10/2000 | Shields |
| 6,139,532 A | 10/2000 | Howell et al. |
| 6,139,557 A | 10/2000 | Passafaro et al. |
| 6,159,179 A | 12/2000 | Simonson |
| 6,171,234 B1 | 1/2001 | White et al. |
| 6,171,287 B1 | 1/2001 | Lynn et al. |
| 6,176,842 B1 | 1/2001 | Tachibana et al. |
| 6,193,690 B1 | 2/2001 | Dysarz |
| 6,197,001 B1 | 3/2001 | Wilson et al. |
| 6,197,007 B1 | 3/2001 | Thorne et al. |
| 6,197,041 B1 | 3/2001 | Shichman et al. |
| 6,203,527 B1 | 3/2001 | Zadini et al. |
| 6,213,978 B1 | 4/2001 | Voyten |
| 6,217,558 B1 | 4/2001 | Zadini et al. |
| 6,221,047 B1 | 4/2001 | Greene et al. |
| 6,221,048 B1 | 4/2001 | Phelps |
| 6,221,049 B1 | 4/2001 | Selmon et al. |
| 6,224,569 B1 | 5/2001 | Brimhall |
| 6,228,060 B1 | 5/2001 | Howell |
| 6,228,062 B1 | 5/2001 | Howell et al. |
| 6,228,073 B1 | 5/2001 | Noone et al. |
| 6,245,045 B1 | 6/2001 | Stratienko |
| 6,251,092 B1 | 6/2001 | Qin et al. |
| 6,268,399 B1 | 7/2001 | Hultine et al. |
| 6,270,480 B1 | 8/2001 | Dorr et al. |
| 6,273,871 B1 | 8/2001 | Davis et al. |
| 6,280,419 B1 | 8/2001 | Vojtasek |
| 6,287,278 B1 | 9/2001 | Woehr et al. |
| 6,309,379 B1 | 10/2001 | Willard et al. |
| 6,319,244 B2 | 11/2001 | Suresh et al. |
| 6,322,537 B1 | 11/2001 | Chang |
| D452,003 S | 12/2001 | Niermann |
| 6,325,781 B1 | 12/2001 | Takagi et al. |
| 6,325,797 B1 | 12/2001 | Stewart et al. |
| 6,336,914 B1 | 1/2002 | Gillespie, III |
| 6,352,520 B1 | 3/2002 | Miyazaki |
| 6,368,337 B1 | 4/2002 | Kieturakis et al. |
| 6,379,333 B1 | 4/2002 | Brimhall et al. |
| 6,379,372 B1 | 4/2002 | Dehdashtian et al. |
| D457,955 S | 5/2002 | Bilitz |
| 6,406,442 B1 | 6/2002 | McFann et al. |
| D460,179 S | 7/2002 | Isoda et al. |
| 6,422,989 B1 | 7/2002 | Hektner |
| 6,436,070 B1 | 8/2002 | Botich et al. |
| 6,436,112 B2 | 8/2002 | Wensel et al. |
| 6,443,929 B1 | 9/2002 | Kuracina et al. |
| 6,451,052 B1 | 9/2002 | Burmeister et al. |
| 6,461,362 B1 | 10/2002 | Halseth et al. |
| 6,475,217 B1 | 11/2002 | Platt |
| 6,478,779 B1 | 11/2002 | Hu |
| 6,485,473 B1 | 11/2002 | Lynn |
| 6,485,497 B2 | 11/2002 | Wensel et al. |
| 6,497,681 B1 | 12/2002 | Brenner |
| 6,506,181 B2 | 1/2003 | Meng et al. |
| 6,514,236 B1 | 2/2003 | Stratienko |
| 6,524,276 B1 | 2/2003 | Halseth et al. |
| D471,980 S | 3/2003 | Caizza |
| 6,527,759 B1 | 3/2003 | Tachibana et al. |
| 6,530,913 B1 | 3/2003 | Giba et al. |
| 6,530,935 B2 | 3/2003 | Wensel et al. |
| 6,540,725 B1 | 4/2003 | Ponzi |
| 6,540,732 B1 | 4/2003 | Botich et al. |
| 6,544,239 B2 | 4/2003 | Kinsey et al. |
| 6,547,762 B1 * | 4/2003 | Botich ............ A61M 25/09041 604/110 |
| 6,558,355 B1 | 5/2003 | Metzger et al. |
| 6,582,402 B1 | 6/2003 | Erskine |
| 6,582,440 B1 | 6/2003 | Brumbach |
| 6,585,703 B1 | 7/2003 | Kassel et al. |
| 6,589,262 B1 | 7/2003 | Honebrink et al. |
| 6,595,955 B2 | 7/2003 | Ferguson et al. |
| 6,595,959 B1 | 7/2003 | Stratienko |
| 6,599,296 B1 | 7/2003 | Gillick et al. |
| 6,607,511 B2 * | 8/2003 | Halseth ............ A61M 25/0631 604/164.08 |
| 6,616,630 B1 | 9/2003 | Woehr et al. |
| 6,620,136 B1 | 9/2003 | Pressly, Sr. et al. |

(56) References Cited

U.S. PATENT DOCUMENTS

| | | |
|---|---|---|
| 6,623,449 B2 | 9/2003 | Paskar |
| 6,623,456 B1 | 9/2003 | Holdaway et al. |
| 6,626,868 B1 | 9/2003 | Prestidge et al. |
| 6,626,869 B1 | 9/2003 | Bint |
| 6,629,959 B2 | 10/2003 | Kuracina et al. |
| 6,632,201 B1 | 10/2003 | Mathias et al. |
| 6,638,252 B2 | 10/2003 | Moulton et al. |
| 6,641,564 B1 | 11/2003 | Kraus |
| 6,645,178 B1 | 11/2003 | Junker et al. |
| 6,652,486 B2 | 11/2003 | Bialecki et al. |
| 6,652,490 B2 | 11/2003 | Howell |
| 6,663,577 B2 | 12/2003 | Jen et al. |
| 6,663,592 B2 | 12/2003 | Rhad et al. |
| 6,666,865 B2 | 12/2003 | Plat |
| 6,679,900 B2 | 1/2004 | Kieturakis et al. |
| 6,689,102 B2 | 2/2004 | Greene |
| 6,692,508 B2 | 2/2004 | Wensel et al. |
| 6,692,509 B2 | 2/2004 | Wensel et al. |
| 6,695,814 B2 | 2/2004 | Greene et al. |
| 6,695,856 B2 | 2/2004 | Kieturakis et al. |
| 6,695,860 B1 | 2/2004 | Ward et al. |
| 6,699,221 B2 | 3/2004 | Vaillancourt |
| 6,702,811 B2 | 3/2004 | Stewart et al. |
| 6,706,018 B2 | 3/2004 | Westlund et al. |
| 6,711,444 B2 | 3/2004 | Koblish |
| 6,712,790 B1 | 3/2004 | Prestidge et al. |
| 6,712,797 B1 | 3/2004 | Southern, Jr. |
| 6,716,197 B2 | 4/2004 | Svendsen |
| 6,730,062 B2 | 5/2004 | Hoffman et al. |
| 6,740,063 B2 | 5/2004 | Lynn |
| 6,740,096 B2 | 5/2004 | Teague et al. |
| 6,745,080 B2 | 6/2004 | Koblish |
| 6,749,588 B1 | 6/2004 | Howell et al. |
| 6,764,468 B1 | 7/2004 | East |
| D494,270 S | 8/2004 | Reschke |
| 6,776,788 B1 | 8/2004 | Klint et al. |
| 6,796,962 B2 | 9/2004 | Ferguson et al. |
| 6,824,545 B2 | 11/2004 | Sepetka et al. |
| 6,832,715 B2 | 12/2004 | Eungard et al. |
| 6,835,190 B2 | 12/2004 | Nguyen |
| 6,837,867 B2 | 1/2005 | Kortelling |
| 6,860,871 B2 | 3/2005 | Kuracina et al. |
| 6,872,193 B2 | 3/2005 | Shaw et al. |
| 6,887,220 B2 | 5/2005 | Hogendijk |
| 6,902,546 B2 | 6/2005 | Ferguson |
| 6,905,483 B2 | 6/2005 | Newby et al. |
| 6,913,595 B2 | 7/2005 | Mastorakis |
| 6,916,311 B2 | 7/2005 | Vojtasek |
| 6,921,386 B2 | 7/2005 | Shue et al. |
| 6,921,391 B1 | 7/2005 | Barker et al. |
| 6,929,624 B1 | 8/2005 | Del Castillo |
| 6,939,325 B2 | 9/2005 | Haining |
| 6,942,652 B1 | 9/2005 | Pressly, Sr. et al. |
| 6,953,448 B2 | 10/2005 | Moulton et al. |
| 6,958,054 B2 | 10/2005 | Fitzgerald |
| 6,958,055 B2 | 10/2005 | Donnan et al. |
| 6,960,191 B2 | 11/2005 | Howlett et al. |
| 6,972,002 B2 | 12/2005 | Thorne |
| 6,974,438 B2 | 12/2005 | Shekalim |
| 6,994,693 B2 | 2/2006 | Tal |
| 7,001,396 B2 | 2/2006 | Glazier et al. |
| 7,004,927 B2 | 2/2006 | Ferguson et al. |
| 7,008,404 B2 | 3/2006 | Nakajima |
| 7,018,372 B2 | 3/2006 | Casey et al. |
| 7,018,390 B2 | 3/2006 | Turovskiy et al. |
| 7,025,746 B2 | 4/2006 | Tal |
| 7,029,467 B2 | 4/2006 | Currier et al. |
| 7,033,335 B2 | 4/2006 | Haarala et al. |
| 7,044,935 B2 | 5/2006 | Shue et al. |
| 7,060,055 B2 | 6/2006 | Wilkinson et al. |
| 7,090,656 B1 | 8/2006 | Botich et al. |
| 7,094,243 B2 | 8/2006 | Mulholland et al. |
| 7,097,633 B2 | 8/2006 | Botich et al. |
| 7,125,396 B2 | 10/2006 | Leinsing et al. |
| 7,125,397 B2 | 10/2006 | Woehr et al. |
| 7,141,040 B2 | 11/2006 | Lichtenberg |
| 7,153,276 B2 | 12/2006 | Barker et al. |
| 7,163,520 B2 | 1/2007 | Bernard et al. |
| 7,169,159 B2 | 1/2007 | Green et al. |
| 7,179,244 B2 | 2/2007 | Smith et al. |
| 7,186,239 B2 | 3/2007 | Woehr |
| 7,191,900 B2 | 3/2007 | Opie et al. |
| 7,192,433 B2 | 3/2007 | Osypka et al. |
| 7,204,813 B2 | 4/2007 | Shue et al. |
| 7,214,211 B2 | 5/2007 | Woehr et al. |
| 7,255,685 B2 | 8/2007 | Pressly, Sr. et al. |
| 7,264,613 B2 | 9/2007 | Woehr et al. |
| 7,291,130 B2 | 11/2007 | McGurk |
| 7,303,547 B2 | 12/2007 | Pressly, Sr. et al. |
| 7,303,548 B2 | 12/2007 | Rhad et al. |
| 7,314,462 B2 | 1/2008 | O'Reagan et al. |
| 7,331,966 B2 | 2/2008 | Soma et al. |
| 7,344,516 B2 | 3/2008 | Erskine |
| 7,354,422 B2 | 4/2008 | Riesenberger et al. |
| 7,374,554 B2 | 5/2008 | Menzi et al. |
| 7,381,205 B2 | 6/2008 | Thommen |
| 7,396,346 B2 | 7/2008 | Nakajima |
| 7,413,562 B2 | 8/2008 | Ferguson et al. |
| 7,422,572 B2 | 9/2008 | Popov et al. |
| 7,458,954 B2 | 12/2008 | Ferguson et al. |
| 7,465,294 B1 | 12/2008 | Vladimirsky |
| 7,468,057 B2 | 12/2008 | Ponzi |
| 7,470,254 B2 | 12/2008 | Basta et al. |
| 7,491,176 B2 | 2/2009 | Mann |
| 7,494,010 B2 | 2/2009 | Opie et al. |
| 7,500,965 B2 | 3/2009 | Menzi et al. |
| 7,507,222 B2 | 3/2009 | Cindrich et al. |
| 7,513,887 B2 | 4/2009 | Halseth et al. |
| 7,513,888 B2 | 4/2009 | Sircom et al. |
| 7,524,306 B2 | 4/2009 | Botich et al. |
| 7,530,965 B2 | 5/2009 | Villa et al. |
| 7,534,227 B2 | 5/2009 | Kulli |
| 7,534,231 B2 | 5/2009 | Kuracina et al. |
| 7,544,170 B2 | 6/2009 | Williams et al. |
| 7,556,617 B2 | 7/2009 | Voorhees, Jr. et al. |
| 7,566,323 B2 | 7/2009 | Chang |
| D601,243 S | 9/2009 | Bierman et al. |
| 7,597,681 B2 | 10/2009 | Sutton et al. |
| 7,608,057 B2 | 10/2009 | Woehr et al. |
| D604,839 S | 11/2009 | Crawford et al. |
| 7,611,485 B2 | 11/2009 | Ferguson |
| 7,611,487 B2 | 11/2009 | Woehr et al. |
| 7,611,499 B2 | 11/2009 | Woehr et al. |
| 7,618,395 B2 | 11/2009 | Ferguson |
| 7,625,360 B2 | 12/2009 | Woehr et al. |
| 7,628,769 B2 | 12/2009 | Grandt et al. |
| 7,632,243 B2 | 12/2009 | Bialecki et al. |
| 7,645,263 B2 | 1/2010 | Angel et al. |
| 7,654,988 B2 | 2/2010 | Moulton et al. |
| 7,658,725 B2 | 2/2010 | Bialecki et al. |
| D612,043 S | 3/2010 | Young et al. |
| 7,678,080 B2 | 3/2010 | Shue et al. |
| 7,682,358 B2 | 3/2010 | Gullickson et al. |
| 7,691,088 B2 | 4/2010 | Howell |
| 7,691,090 B2 | 4/2010 | Belley et al. |
| 7,691,093 B2 | 4/2010 | Brimhall |
| 7,695,458 B2 | 4/2010 | Belley et al. |
| 7,699,807 B2 | 4/2010 | Faust et al. |
| D615,197 S | 5/2010 | Koh et al. |
| 7,708,721 B2 | 5/2010 | Khaw |
| 7,713,243 B2 | 5/2010 | Hillman |
| 7,717,875 B2 | 5/2010 | Knudson et al. |
| 7,722,567 B2 | 5/2010 | Tal |
| 7,722,569 B2 | 5/2010 | Soderholm et al. |
| D617,893 S | 6/2010 | Bierman et al. |
| 7,731,687 B2 | 6/2010 | Menzi et al. |
| 7,731,691 B2 | 6/2010 | Cote et al. |
| 7,736,332 B2 | 6/2010 | Carlyon et al. |
| 7,736,337 B2 | 6/2010 | Diep et al. |
| 7,736,339 B2 | 6/2010 | Woehr et al. |
| 7,736,342 B2 | 6/2010 | Abriles et al. |
| 7,740,615 B2 | 6/2010 | Shaw et al. |
| 7,744,574 B2 | 6/2010 | Pederson et al. |
| 7,753,877 B2 | 7/2010 | Bialecki et al. |

(56) References Cited

U.S. PATENT DOCUMENTS

| | | |
|---|---|---|
| 7,753,887 B2 | 7/2010 | Botich et al. |
| 7,762,984 B2 | 7/2010 | Kumoyama et al. |
| 7,762,993 B2 | 7/2010 | Perez |
| 7,766,879 B2 | 8/2010 | Tan et al. |
| 7,776,052 B2 | 8/2010 | Greenberg et al. |
| 7,785,296 B2 | 8/2010 | Muskatello et al. |
| 7,794,424 B2 | 9/2010 | Paskar |
| 7,798,994 B2 | 9/2010 | Brimhall |
| 7,803,142 B2 | 9/2010 | Longson et al. |
| 7,828,773 B2 | 11/2010 | Swisher et al. |
| 7,828,774 B2 | 11/2010 | Harding et al. |
| 7,833,201 B2 | 11/2010 | Carlyon et al. |
| 7,850,644 B2 | 12/2010 | Gonzalez et al. |
| 7,857,770 B2 | 12/2010 | Raulerson et al. |
| D634,843 S | 3/2011 | Kim et al. |
| 7,896,862 B2 | 3/2011 | Long et al. |
| 7,905,857 B2 | 3/2011 | Swisher |
| 7,914,488 B2 | 3/2011 | Dickerson |
| 7,914,492 B2 | 3/2011 | Heuser |
| 7,922,696 B2 | 4/2011 | Tal et al. |
| 7,922,698 B2 | 4/2011 | Riesenberger et al. |
| 7,927,314 B2 | 4/2011 | Kuracina et al. |
| 7,935,080 B2 | 5/2011 | Howell et al. |
| 7,959,613 B2 | 6/2011 | Rhad et al. |
| 7,972,313 B2 | 7/2011 | Woehr et al. |
| 7,972,324 B2 | 7/2011 | Quint |
| D643,531 S | 8/2011 | van der Weiden |
| 8,029,470 B2 | 10/2011 | Whiting et al. |
| 8,029,472 B2 | 10/2011 | Einsing et al. |
| 8,048,031 B2 | 11/2011 | Shaw et al. |
| 8,048,039 B2 | 11/2011 | Carlyon et al. |
| 8,057,404 B2 | 11/2011 | Fujiwara et al. |
| 8,062,261 B2 | 11/2011 | Adams |
| 8,075,529 B2 | 12/2011 | Nakajima et al. |
| 8,079,979 B2 | 12/2011 | Moorehead |
| D653,329 S | 1/2012 | Lee-Sepsick |
| 8,100,858 B2 | 1/2012 | Woehr et al. |
| 8,105,286 B2 | 1/2012 | Anderson et al. |
| 8,105,315 B2 | 1/2012 | Johnson et al. |
| 8,123,727 B2 | 2/2012 | Luther et al. |
| 8,152,758 B2 | 4/2012 | Chan et al. |
| 8,162,881 B2 | 4/2012 | Lilley, Jr. et al. |
| 8,167,851 B2 | 5/2012 | Sen |
| 8,177,753 B2 | 5/2012 | Vitullo et al. |
| RE43,473 E | 6/2012 | Newby et al. |
| 8,192,402 B2 | 6/2012 | Anderson et al. |
| 8,202,251 B2 | 6/2012 | Bierman et al. |
| 8,202,253 B1 | 6/2012 | Wexler |
| 8,206,343 B2 | 6/2012 | Racz |
| 8,211,070 B2 | 7/2012 | Woehr et al. |
| 8,221,387 B2 | 7/2012 | Shelso et al. |
| 8,226,612 B2 | 7/2012 | Nakajima |
| 8,235,945 B2 | 8/2012 | Baid |
| 8,251,923 B2 | 8/2012 | Carrez et al. |
| 8,251,950 B2 | 8/2012 | Albert et al. |
| D667,111 S | 9/2012 | Robinson |
| 8,257,322 B2 | 9/2012 | Koehler et al. |
| 8,273,054 B2 | 9/2012 | St. Germain et al. |
| 8,286,657 B2 | 10/2012 | Belley et al. |
| 8,298,186 B2 | 10/2012 | Popov |
| 8,303,543 B2 | 11/2012 | Abulhaj |
| 8,308,685 B2 | 11/2012 | Botich et al. |
| 8,308,691 B2 | 11/2012 | Woehr et al. |
| D672,456 S | 12/2012 | Lee-Sepsick |
| 8,323,249 B2 | 12/2012 | White et al. |
| 8,328,762 B2 | 12/2012 | Woehr et al. |
| 8,328,837 B2 | 12/2012 | Binmoeller |
| 8,333,735 B2 | 12/2012 | Woehr et al. |
| 8,337,424 B2 | 12/2012 | Palmer et al. |
| 8,337,463 B2 | 12/2012 | Woehr et al. |
| 8,337,471 B2 | 12/2012 | Baid |
| D675,318 S | 1/2013 | Luk et al. |
| 8,361,020 B2 | 1/2013 | Stout |
| 8,361,038 B2 | 1/2013 | McKinnon et al. |
| 8,376,994 B2 | 2/2013 | Woehr et al. |
| 8,377,006 B2 | 2/2013 | Tal et al. |
| 8,382,721 B2 | 2/2013 | Woehr et al. |
| 8,388,583 B2 | 3/2013 | Stout et al. |
| 8,403,886 B2 | 3/2013 | Bialecki et al. |
| 8,412,300 B2 | 4/2013 | Sonderegger |
| 8,414,539 B1 | 4/2013 | Kuracina et al. |
| 8,419,688 B2 | 4/2013 | Woehr et al. |
| 8,444,605 B2 | 5/2013 | Kuracina et al. |
| 8,454,536 B2 | 6/2013 | Raulerson et al. |
| 8,460,247 B2 | 6/2013 | Woehr et al. |
| 8,469,928 B2 | 6/2013 | Stout et al. |
| 8,496,628 B2 | 7/2013 | Erskine |
| D687,548 S | 8/2013 | Hayashi |
| 8,506,533 B2 | 8/2013 | Carlyon et al. |
| 8,509,340 B2 | 8/2013 | Michelitsch |
| 8,517,959 B2 | 8/2013 | Kurosawa et al. |
| 8,529,515 B2 | 9/2013 | Woehr et al. |
| 8,535,271 B2 | 9/2013 | Fuchs et al. |
| 8,540,728 B2 | 9/2013 | Woehr et al. |
| 8,545,454 B2 | 10/2013 | Kuracina et al. |
| 8,568,372 B2 | 10/2013 | Woehr et al. |
| 8,574,203 B2 | 11/2013 | Stout et al. |
| 8,579,881 B2 | 11/2013 | Agro et al. |
| 8,585,651 B2 | 11/2013 | Asai |
| 8,585,660 B2 | 11/2013 | Murphy |
| 8,591,467 B2 | 11/2013 | Walker et al. |
| 8,591,468 B2 | 11/2013 | Woehr et al. |
| 8,597,249 B2 | 12/2013 | Woehr et al. |
| 8,622,931 B2 | 1/2014 | Teague et al. |
| 8,622,958 B2 | 1/2014 | Jones et al. |
| 8,622,972 B2 | 1/2014 | Nystrom et al. |
| D700,318 S | 2/2014 | Amoah et al. |
| 8,647,301 B2 | 2/2014 | Bialecki et al. |
| 8,647,313 B2 | 2/2014 | Woehr et al. |
| 8,647,324 B2 | 2/2014 | DeLegge et al. |
| 8,652,104 B2 | 2/2014 | Goral et al. |
| 8,657,790 B2 | 2/2014 | Tal et al. |
| 8,672,888 B2 | 3/2014 | Tal |
| 8,679,063 B2 | 3/2014 | Stout et al. |
| 8,690,833 B2 | 4/2014 | Belson |
| 8,715,242 B2 | 5/2014 | Helm, Jr. |
| 8,721,546 B2 | 5/2014 | Belson |
| 8,728,030 B2 | 5/2014 | Woehr |
| 8,728,035 B2 | 5/2014 | Warring et al. |
| 8,740,859 B2 | 6/2014 | McKinnon et al. |
| 8,740,964 B2 | 6/2014 | Hartley |
| 8,747,387 B2 | 6/2014 | Belley et al. |
| 8,753,317 B2 | 6/2014 | Osborne et al. |
| 8,764,711 B2 | 7/2014 | Kuracina et al. |
| D710,495 S | 8/2014 | Wu et al. |
| 8,814,833 B2 | 8/2014 | Farrell et al. |
| D713,957 S | 9/2014 | Woehr et al. |
| D714,436 S | 9/2014 | Lee-Sepsick |
| 8,827,965 B2 | 9/2014 | Woehr et al. |
| 8,845,584 B2 | 9/2014 | Ferguson et al. |
| D715,931 S | 10/2014 | Watanabe et al. |
| 8,864,714 B2 | 10/2014 | Harding et al. |
| 8,900,192 B2 | 12/2014 | Anderson et al. |
| 8,932,257 B2 | 1/2015 | Woehr |
| 8,932,258 B2 | 1/2015 | Blanchard et al. |
| 8,932,259 B2 | 1/2015 | Stout et al. |
| 8,945,011 B2 | 2/2015 | Sheldon et al. |
| 8,951,230 B2 | 2/2015 | Tanabe et al. |
| 8,956,327 B2 | 2/2015 | Bierman et al. |
| 8,974,426 B2 | 3/2015 | Corcoran et al. |
| 8,979,802 B2 | 3/2015 | Woehr |
| 8,986,227 B2 | 3/2015 | Belson |
| D726,908 S | 4/2015 | Yu et al. |
| 8,998,852 B2 | 4/2015 | Blanchard et al. |
| 9,005,169 B2 | 4/2015 | Gravesen et al. |
| 9,011,351 B2 | 4/2015 | Hoshinouchi |
| 9,011,381 B2 | 4/2015 | Yamada et al. |
| D728,781 S | 5/2015 | Pierson et al. |
| 9,022,979 B2 | 5/2015 | Woehr |
| 9,033,927 B2 | 5/2015 | Maan et al. |
| D733,289 S | 6/2015 | Blanchard et al. |
| 9,044,583 B2 | 6/2015 | Vaillancourt |
| D735,321 S | 7/2015 | Blanchard |
| 9,089,671 B2 | 7/2015 | Stout et al. |

(56) References Cited

U.S. PATENT DOCUMENTS

| | | |
|---|---|---|
| 9,089,674 B2 | 7/2015 | Ginn et al. |
| 9,095,683 B2 | 8/2015 | Hall et al. |
| 9,101,746 B2 | 8/2015 | Stout et al. |
| 9,108,021 B2 | 8/2015 | Hyer et al. |
| 9,114,231 B2 | 8/2015 | Woehr et al. |
| 9,114,241 B2 | 8/2015 | Stout et al. |
| 9,126,012 B2 | 9/2015 | McKinnon et al. |
| 9,138,252 B2 | 9/2015 | Bierman et al. |
| 9,138,545 B2 | 9/2015 | Shaw et al. |
| 9,138,559 B2 | 9/2015 | Odland et al. |
| RE45,776 E | 10/2015 | Root et al. |
| D740,410 S | 10/2015 | Korkuch et al. |
| 9,149,625 B2 | 10/2015 | Woehr et al. |
| 9,149,626 B2 | 10/2015 | Woehr et al. |
| 9,155,863 B2 | 10/2015 | Isaacson et al. |
| 9,162,036 B2 | 10/2015 | Caples et al. |
| 9,162,037 B2 | 10/2015 | Belson et al. |
| 9,180,275 B2 | 11/2015 | Helm |
| D746,445 S | 12/2015 | Lazarus |
| 9,205,231 B2 | 12/2015 | Call et al. |
| 9,216,109 B2 | 12/2015 | Badawi et al. |
| 9,220,531 B2 | 12/2015 | Datta et al. |
| 9,220,871 B2 | 12/2015 | Thorne et al. |
| 9,220,882 B2 | 12/2015 | Belley et al. |
| D748,254 S | 1/2016 | Freigang et al. |
| 9,227,038 B2 | 1/2016 | Woehr |
| 9,242,071 B2 | 1/2016 | Morgan et al. |
| 9,242,072 B2 | 1/2016 | Morgan et al. |
| RE45,896 E | 2/2016 | Stout et al. |
| D748,774 S | 2/2016 | Caron |
| D748,777 S | 2/2016 | Uenishi et al. |
| D749,214 S | 2/2016 | Uenishi et al. |
| D749,727 S | 2/2016 | Wapler et al. |
| D751,194 S | 3/2016 | Yu et al. |
| D752,737 S | 3/2016 | Ohashi |
| 9,289,237 B2 | 3/2016 | Woehr et al. |
| 9,308,352 B2 | 4/2016 | Teoh et al. |
| 9,308,354 B2 | 4/2016 | Farrell et al. |
| 9,320,870 B2 | 4/2016 | Woehr |
| D755,368 S | 5/2016 | Efinger et al. |
| 9,352,119 B2 | 5/2016 | Burkholz et al. |
| 9,352,127 B2 | 5/2016 | Yeh et al. |
| 9,352,129 B2 | 5/2016 | Nardeo et al. |
| 9,358,364 B2 | 6/2016 | Isaacson et al. |
| 9,370,641 B2 | 6/2016 | Woehr et al. |
| 9,381,324 B2 | 7/2016 | Fuchs et al. |
| 9,399,116 B2 | 7/2016 | Goral et al. |
| 9,408,569 B2 | 8/2016 | Andreae et al. |
| 9,421,345 B2 | 8/2016 | Woehr et al. |
| 9,427,549 B2 | 8/2016 | Woehr et al. |
| D775,330 S | 12/2016 | Blennow et al. |
| 9,522,254 B2 | 12/2016 | Belson |
| D776,259 S | 1/2017 | Eldredge |
| 9,545,495 B2 | 1/2017 | Goral et al. |
| 9,554,817 B2 | 1/2017 | Goldfarb et al. |
| D779,059 S | 2/2017 | Nino et al. |
| D779,661 S | 2/2017 | McKnight et al. |
| 9,579,486 B2 | 2/2017 | Burkholz et al. |
| 9,586,027 B2 | 3/2017 | Tisci et al. |
| 9,592,367 B2 | 3/2017 | Harding et al. |
| 9,616,201 B2 | 4/2017 | Belson |
| 9,623,210 B2 | 4/2017 | Woehr |
| 9,675,784 B2 | 6/2017 | Belson |
| 9,687,633 B2 | 6/2017 | Teoh |
| D791,311 S | 7/2017 | Yantz |
| 9,707,378 B2 | 7/2017 | Leinsing et al. |
| 9,717,523 B2 | 8/2017 | Feng et al. |
| 9,717,887 B2 | 8/2017 | Tan |
| 9,737,252 B2 | 8/2017 | Teoh et al. |
| 9,750,532 B2 | 9/2017 | Toomey et al. |
| 9,750,928 B2 | 9/2017 | Burkholz et al. |
| 9,757,540 B2 | 9/2017 | Belson |
| 9,764,085 B2 | 9/2017 | Teoh |
| 9,764,117 B2 | 9/2017 | Bierman et al. |
| 9,775,972 B2 | 10/2017 | Christensen et al. |
| 9,782,568 B2 | 10/2017 | Belson |
| 9,789,279 B2 | 10/2017 | Burkholz et al. |
| 9,795,766 B2 | 10/2017 | Teoh |
| 9,844,646 B2 | 12/2017 | Knutsson |
| 9,861,792 B2 | 1/2018 | Hall et al. |
| 9,872,971 B2 | 1/2018 | Blanchard |
| D810,282 S | 2/2018 | Ratjen |
| D815,737 S | 4/2018 | Bergstrom et al. |
| 9,950,139 B2 | 4/2018 | Blanchard et al. |
| 9,962,525 B2 | 5/2018 | Woehr |
| 10,004,878 B2 | 6/2018 | Ishida |
| 10,086,171 B2 | 10/2018 | Belson |
| 10,232,146 B2 | 3/2019 | Braithwaite et al. |
| 10,328,239 B2 | 6/2019 | Belson |
| 10,357,635 B2 | 7/2019 | Korkuch et al. |
| 10,384,039 B2 | 8/2019 | Ribelin et al. |
| 10,426,931 B2 | 10/2019 | Blanchard et al. |
| D870,271 S | 12/2019 | Kheradpir et al. |
| D870,883 S | 12/2019 | Harding et al. |
| 10,493,262 B2 | 12/2019 | Tran et al. |
| 10,525,236 B2 | 1/2020 | Belson |
| 10,688,280 B2 | 6/2020 | Blanchard et al. |
| 10,688,281 B2 | 6/2020 | Blanchard et al. |
| 10,722,685 B2 | 7/2020 | Blanchard et al. |
| 10,806,906 B2 | 10/2020 | Warring et al. |
| D914,208 S | 3/2021 | Shabudin et al. |
| D917,694 S | 4/2021 | Schneider et al. |
| D921,884 S | 6/2021 | Tran et al. |
| D929,580 S | 8/2021 | Bornhoft |
| D933,216 S | 10/2021 | Gloess et al. |
| D933,820 S | 10/2021 | Ota |
| D942,621 S | 2/2022 | Cheng et al. |
| D944,395 S | 2/2022 | Harris et al. |
| D950,719 S | 5/2022 | Moore et al. |
| D952,842 S | 5/2022 | Harris et al. |
| D954,258 S | 6/2022 | Hang et al. |
| 11,389,626 B2 | 7/2022 | Tran et al. |
| 11,400,260 B2 | 8/2022 | Huang et al. |
| D964,559 S | 9/2022 | Fujii et al. |
| D967,408 S | 10/2022 | Tanaka et al. |
| D982,741 S | 4/2023 | Lee-Sepsick et al. |
| D988,509 S | 6/2023 | Ko |
| D1,015,525 S | 2/2024 | Fang |
| D1,026,213 S | 5/2024 | Healy et al. |
| D1,037,439 S | 7/2024 | Williams et al. |
| D1,042,801 S | 9/2024 | Sender et al. |
| D1,042,874 S | 9/2024 | Perera et al. |
| D1,043,969 S | 9/2024 | Howard-Sparks et al. |
| D1,054,556 S | 12/2024 | Bornhoft |
| D1,069,106 S | 4/2025 | Stats et al. |
| 2001/0014786 A1 | 8/2001 | Greene et al. |
| 2001/0020153 A1 | 9/2001 | Howell |
| 2002/0052576 A1 | 5/2002 | Massengale |
| 2002/0077595 A1 | 6/2002 | Hundertmark et al. |
| 2002/0103446 A1 | 8/2002 | McFann et al. |
| 2002/0107526 A1 | 8/2002 | Greenberg et al. |
| 2002/0128604 A1 | 9/2002 | Nakajima |
| 2002/0165497 A1 | 11/2002 | Greene |
| 2002/0177812 A1 | 11/2002 | Moulton et al. |
| 2003/0032922 A1 | 2/2003 | Moorehead |
| 2003/0032936 A1 | 2/2003 | Lederman |
| 2003/0060760 A1 | 3/2003 | Botich et al. |
| 2003/0073956 A1 | 4/2003 | Hoffman et al. |
| 2003/0120214 A1 | 6/2003 | Howell |
| 2003/0153874 A1 | 8/2003 | Tal |
| 2003/0167060 A1 | 9/2003 | Buzzard et al. |
| 2003/0187396 A1 | 10/2003 | Ponzi |
| 2003/0204186 A1 | 10/2003 | Geistert |
| 2004/0019329 A1 | 1/2004 | Erskine |
| 2004/0030291 A1 | 2/2004 | Holdaway et al. |
| 2004/0034383 A1 | 2/2004 | Belson |
| 2004/0044302 A1 | 3/2004 | Bernard et al. |
| 2004/0044313 A1 | 3/2004 | Nakajima |
| 2004/0092879 A1 | 5/2004 | Kraus et al. |
| 2004/0106903 A1 | 6/2004 | Shue et al. |
| 2004/0111059 A1 | 6/2004 | Howlett et al. |
| 2004/0122373 A1* | 6/2004 | Botich ............... A61M 25/0631 |
| | | 604/164.12 |
| 2004/0176758 A1 | 9/2004 | Yassinzadeh |

(56) References Cited

U.S. PATENT DOCUMENTS

| | | |
|---|---|---|
| 2004/0193118 A1 | 9/2004 | Bergeron |
| 2004/0215146 A1 | 10/2004 | Lampropoulos et al. |
| 2004/0236288 A1 | 11/2004 | Howell et al. |
| 2004/0243061 A1 | 12/2004 | McGurk |
| 2004/0267204 A1 | 12/2004 | Brustowicz |
| 2005/0004524 A1 | 1/2005 | Newby et al. |
| 2005/0004532 A1 | 1/2005 | Woehr et al. |
| 2005/0010095 A1 | 1/2005 | Stewart et al. |
| 2005/0020940 A1 | 1/2005 | Opie et al. |
| 2005/0021002 A1 | 1/2005 | Deckman et al. |
| 2005/0027256 A1* | 2/2005 | Barker ............ A61B 5/150389 604/164.12 |
| 2005/0033137 A1 | 2/2005 | Oral et al. |
| 2005/0040061 A1 | 2/2005 | Opie et al. |
| 2005/0075606 A1 | 4/2005 | Botich et al. |
| 2005/0107769 A1 | 5/2005 | Thommen |
| 2005/0119619 A1 | 6/2005 | Haining |
| 2005/0131350 A1 | 6/2005 | Shaw et al. |
| 2005/0165355 A1* | 7/2005 | Fitzgerald ........ A61M 25/0631 604/164.08 |
| 2005/0197623 A1 | 9/2005 | Leeflang et al. |
| 2005/0245847 A1 | 11/2005 | Schaeffer |
| 2005/0256505 A1 | 11/2005 | Long et al. |
| 2005/0273057 A1 | 12/2005 | Popov |
| 2006/0025721 A1 | 2/2006 | Duffy et al. |
| 2006/0036219 A1 | 2/2006 | Alvin |
| 2006/0079787 A1 | 4/2006 | Whiting et al. |
| 2006/0084964 A1 | 4/2006 | Knudson et al. |
| 2006/0155245 A1 | 7/2006 | Woehr |
| 2006/0161115 A1 | 7/2006 | Fangrow |
| 2006/0167405 A1 | 7/2006 | King et al. |
| 2006/0200080 A1* | 9/2006 | Abulhaj ........... A61M 25/0631 604/164.01 |
| 2006/0229563 A1 | 10/2006 | O'Reagan et al. |
| 2006/0264834 A1 | 11/2006 | Vaillancourt |
| 2006/0264841 A1 | 11/2006 | Cote et al. |
| 2007/0043422 A1 | 2/2007 | Shmulewitz et al. |
| 2007/0060999 A1 | 3/2007 | Randall et al. |
| 2007/0066960 A1* | 3/2007 | Jones ............... A61B 5/150717 604/164.08 |
| 2007/0083162 A1 | 4/2007 | O'Reagan et al. |
| 2007/0083188 A1 | 4/2007 | Grandt et al. |
| 2007/0100284 A1 | 5/2007 | Leinsing et al. |
| 2007/0123803 A1 | 5/2007 | Fujiwara et al. |
| 2007/0142779 A1 | 6/2007 | Duane et al. |
| 2007/0179446 A1 | 8/2007 | Carrez et al. |
| 2007/0185456 A1* | 8/2007 | Nakajima .......... A61M 5/3257 604/164.08 |
| 2007/0191777 A1 | 8/2007 | King |
| 2007/0191786 A1 | 8/2007 | Raines et al. |
| 2007/0193903 A1 | 8/2007 | Opie et al. |
| 2007/0225647 A1 | 9/2007 | Luther et al. |
| 2007/0233007 A1 | 10/2007 | Adams |
| 2007/0244438 A1 | 10/2007 | Perez |
| 2007/0255221 A1* | 11/2007 | Nakajima .......... A61M 25/0606 604/168.01 |
| 2007/0276288 A1 | 11/2007 | Khaw |
| 2008/0039796 A1 | 2/2008 | Nakajima |
| 2008/0065011 A1 | 3/2008 | Marchand et al. |
| 2008/0082082 A1 | 4/2008 | Carlyon et al. |
| 2008/0097330 A1 | 4/2008 | King et al. |
| 2008/0108911 A1 | 5/2008 | Palmer et al. |
| 2008/0108944 A1 | 5/2008 | Woehr et al. |
| 2008/0108974 A1 | 5/2008 | Yee Roth |
| 2008/0125709 A1 | 5/2008 | Chang et al. |
| 2008/0131300 A1 | 6/2008 | Junod et al. |
| 2008/0132846 A1 | 6/2008 | Shue et al. |
| 2008/0147010 A1 | 6/2008 | Nakajima et al. |
| 2008/0243165 A1 | 10/2008 | Mauch et al. |
| 2008/0262430 A1 | 10/2008 | Anderson et al. |
| 2008/0262431 A1 | 10/2008 | Anderson et al. |
| 2008/0294111 A1 | 11/2008 | Tal et al. |
| 2008/0300574 A1 | 12/2008 | Belson et al. |
| 2009/0018567 A1 | 1/2009 | Escudero et al. |
| 2009/0030380 A1 | 1/2009 | Binmoeller |
| 2009/0036836 A1 | 2/2009 | Nystrom et al. |
| 2009/0048566 A1 | 2/2009 | Ferguson et al. |
| 2009/0131872 A1 | 5/2009 | Popov |
| 2009/0157006 A1 | 6/2009 | Nardeo et al. |
| 2009/0163942 A1* | 6/2009 | Cuevas ............ A61M 16/0472 606/167 |
| 2009/0221961 A1 | 9/2009 | Tal et al. |
| 2009/0227953 A1 | 9/2009 | Tan et al. |
| 2009/0287154 A1 | 11/2009 | Harding et al. |
| 2009/0292243 A1 | 11/2009 | Harding et al. |
| 2009/0299291 A1 | 12/2009 | Baid |
| 2009/0306602 A1* | 12/2009 | Elwell ................ A61M 25/02 604/180 |
| 2010/0010441 A1 | 1/2010 | Belson |
| 2010/0010447 A1 | 1/2010 | Luther et al. |
| 2010/0016838 A1 | 1/2010 | Butts et al. |
| 2010/0036331 A1 | 2/2010 | Sen |
| 2010/0056910 A1 | 3/2010 | Yanuma |
| 2010/0057183 A1 | 3/2010 | Mangiardi et al. |
| 2010/0087787 A1 | 4/2010 | Woehr et al. |
| 2010/0094116 A1 | 4/2010 | Silverstein |
| 2010/0094310 A1 | 4/2010 | Warring et al. |
| 2010/0137815 A1 | 6/2010 | Kuracina et al. |
| 2010/0168674 A1 | 7/2010 | Shaw et al. |
| 2010/0204654 A1 | 8/2010 | Mulholland et al. |
| 2010/0204660 A1 | 8/2010 | McKinnon et al. |
| 2010/0204675 A1 | 8/2010 | Woehr et al. |
| 2010/0210934 A1* | 8/2010 | Belson ............... A61B 17/3421 604/164.11 |
| 2010/0238705 A1 | 9/2010 | Kim et al. |
| 2010/0246707 A1 | 9/2010 | Michelitsch |
| 2010/0331732 A1 | 12/2010 | Raulerson et al. |
| 2011/0004162 A1 | 1/2011 | Tal |
| 2011/0009827 A1 | 1/2011 | Bierman et al. |
| 2011/0015573 A1 | 1/2011 | Maan et al. |
| 2011/0021994 A1 | 1/2011 | Anderson et al. |
| 2011/0046570 A1 | 2/2011 | Stout et al. |
| 2011/0125097 A1 | 5/2011 | Shaw et al. |
| 2011/0137252 A1 | 6/2011 | Oster et al. |
| 2011/0196315 A1 | 8/2011 | Chappel |
| 2011/0207157 A1 | 8/2011 | Gautier et al. |
| 2011/0218496 A1 | 9/2011 | Bierman |
| 2011/0251559 A1 | 10/2011 | Tal et al. |
| 2011/0276002 A1 | 11/2011 | Bierman |
| 2011/0282285 A1 | 11/2011 | Blanchard et al. |
| 2011/0288482 A1 | 11/2011 | Farrell et al. |
| 2011/0306933 A1 | 12/2011 | Djordjevic et al. |
| 2011/0319838 A1 | 12/2011 | Goral et al. |
| 2012/0053523 A1 | 3/2012 | Harding |
| 2012/0071831 A1* | 3/2012 | Erskine ............ A61M 25/0631 604/164.08 |
| 2012/0071857 A1 | 3/2012 | Goldfarb et al. |
| 2012/0078231 A1 | 3/2012 | Hoshinouchi |
| 2012/0101440 A1 | 4/2012 | Kamen et al. |
| 2012/0123332 A1 | 5/2012 | Erskine |
| 2012/0123354 A1 | 5/2012 | Woehr |
| 2012/0157854 A1 | 6/2012 | Kurrus et al. |
| 2012/0179104 A1 | 7/2012 | Woehr et al. |
| 2012/0184896 A1 | 7/2012 | DeLegge et al. |
| 2012/0197200 A1 | 8/2012 | Belson |
| 2012/0220942 A1 | 8/2012 | Hall et al. |
| 2012/0220956 A1 | 8/2012 | Kuracina et al. |
| 2012/0259293 A1 | 10/2012 | Bialecki et al. |
| 2012/0271232 A1 | 10/2012 | Katsurada et al. |
| 2012/0296282 A1 | 11/2012 | Koehler et al. |
| 2012/0310179 A1 | 12/2012 | Truitt et al. |
| 2012/0316500 A1 | 12/2012 | Bierman et al. |
| 2012/0323181 A1 | 12/2012 | Shaw et al. |
| 2013/0030391 A1 | 1/2013 | Baid |
| 2013/0158506 A1 | 6/2013 | Harris et al. |
| 2013/0184645 A1 | 7/2013 | Baid |
| 2013/0204206 A1 | 8/2013 | Morgan et al. |
| 2013/0204226 A1 | 8/2013 | Keyser |
| 2013/0218082 A1 | 8/2013 | Hyer et al. |
| 2013/0304030 A1 | 11/2013 | Gray et al. |
| 2013/0310764 A1 | 11/2013 | Burkholz et al. |
| 2013/0324930 A1 | 12/2013 | Fuchs et al. |
| 2014/0012203 A1 | 1/2014 | Woehr et al. |

(56) References Cited

U.S. PATENT DOCUMENTS

| | | |
|---|---|---|
| 2014/0031752 A1 | 1/2014 | Blanchard et al. |
| 2014/0039461 A1 | 2/2014 | Anderson et al. |
| 2014/0058329 A1 | 2/2014 | Walker et al. |
| 2014/0058336 A1 | 2/2014 | Burkholz et al. |
| 2014/0058357 A1 | 2/2014 | Keyser et al. |
| 2014/0073928 A1 | 3/2014 | Yamashita et al. |
| 2014/0074034 A1 | 3/2014 | Tanabe et al. |
| 2014/0088509 A1 | 3/2014 | Sonderegger et al. |
| 2014/0094774 A1 | 4/2014 | Blanchard |
| 2014/0094836 A1 | 4/2014 | Feng et al. |
| 2014/0114239 A1 | 4/2014 | Dib et al. |
| 2014/0128775 A1 | 5/2014 | Andreae et al. |
| 2014/0135702 A1 | 5/2014 | Woehr et al. |
| 2014/0135703 A1 | 5/2014 | Yeh et al. |
| 2014/0143999 A1 | 5/2014 | Goral et al. |
| 2014/0180250 A1 | 6/2014 | Belson |
| 2014/0188003 A1 | 7/2014 | Belson |
| 2014/0194853 A1 | 7/2014 | Morgan et al. |
| 2014/0214005 A1 | 7/2014 | Belson |
| 2014/0221977 A1 | 8/2014 | Belson |
| 2014/0236099 A1 | 8/2014 | Nakagami et al. |
| 2014/0243734 A1 | 8/2014 | Eubanks et al. |
| 2014/0249488 A1 | 9/2014 | Woehr |
| 2014/0257359 A1 | 9/2014 | Tegels et al. |
| 2014/0276224 A1 | 9/2014 | Ranganathan et al. |
| 2014/0276432 A1 | 9/2014 | Bierman et al. |
| 2014/0276434 A1 | 9/2014 | Woehr et al. |
| 2014/0303561 A1 | 10/2014 | Li |
| 2014/0323988 A1 | 10/2014 | Magnani et al. |
| 2014/0336582 A1* | 11/2014 | Tisci ............... A61M 25/0606 604/164.08 |
| 2014/0357983 A1 | 12/2014 | Toomey et al. |
| 2014/0358123 A1 | 12/2014 | Ueda et al. |
| 2014/0364809 A1 | 12/2014 | Isaacson et al. |
| 2014/0371715 A1 | 12/2014 | Farrell et al. |
| 2014/0371720 A1 | 12/2014 | Urmey |
| 2014/0378867 A1 | 12/2014 | Belson |
| 2015/0025467 A1 | 1/2015 | Woehr |
| 2015/0038909 A1 | 2/2015 | Christensen et al. |
| 2015/0038910 A1 | 2/2015 | Harding et al. |
| 2015/0038943 A1 | 2/2015 | Warring et al. |
| 2015/0051584 A1 | 2/2015 | Korkuch et al. |
| 2015/0080801 A1 | 3/2015 | Tanabe et al. |
| 2015/0080810 A1 | 3/2015 | Henderson et al. |
| 2015/0088095 A1 | 3/2015 | Luther et al. |
| 2015/0094659 A1 | 4/2015 | Schraga |
| 2015/0119806 A1 | 4/2015 | Blanchard et al. |
| 2015/0119852 A1 | 4/2015 | Wexler |
| 2015/0126932 A1 | 5/2015 | Knutsson |
| 2015/0151086 A1 | 6/2015 | Teoh |
| 2015/0151088 A1 | 6/2015 | Lim et al. |
| 2015/0190168 A1 | 7/2015 | Bierman et al. |
| 2015/0190570 A1 | 7/2015 | Teoh |
| 2015/0190617 A1 | 7/2015 | Anderson et al. |
| 2015/0202414 A1 | 7/2015 | Hwang |
| 2015/0202421 A1 | 7/2015 | Ma et al. |
| 2015/0224267 A1 | 8/2015 | Farrell et al. |
| 2015/0231364 A1 | 8/2015 | Blanchard et al. |
| 2015/0238705 A1 | 8/2015 | Gravesen et al. |
| 2015/0290431 A1 | 10/2015 | Hall et al. |
| 2015/0306347 A1 | 10/2015 | Yagi |
| 2015/0306356 A1 | 10/2015 | Gill |
| 2015/0328434 A1 | 11/2015 | Gaur |
| 2015/0328438 A1 | 11/2015 | Baid |
| 2015/0335858 A1 | 11/2015 | Woehr et al. |
| 2015/0359473 A1 | 12/2015 | Garrett et al. |
| 2016/0008538 A1* | 1/2016 | Isaacson ............ A61M 25/0631 604/263 |
| 2016/0008580 A1 | 1/2016 | Woehr et al. |
| 2016/0015943 A1 | 1/2016 | Belson et al. |
| 2016/0015945 A1 | 1/2016 | Warring et al. |
| 2016/0022312 A1 | 1/2016 | Tang et al. |
| 2016/0022963 A1 | 1/2016 | Belson |
| 2016/0030716 A1 | 2/2016 | Mallin et al. |
| 2016/0045715 A1 | 2/2016 | Galgano et al. |
| 2016/0089513 A1 | 3/2016 | Ishida |
| 2016/0106959 A1 | 4/2016 | Woehr |
| 2016/0114136 A1 | 4/2016 | Woehr |
| 2016/0114137 A1 | 4/2016 | Woehr et al. |
| 2016/0158503 A1 | 6/2016 | Woehr |
| 2016/0158526 A1 | 6/2016 | Woehr |
| 2016/0175563 A1* | 6/2016 | Woehr ............... A61M 25/0606 604/168.01 |
| 2016/0184557 A1 | 6/2016 | Call et al. |
| 2016/0199575 A1 | 7/2016 | Belley et al. |
| 2016/0206852 A1 | 7/2016 | Morgan et al. |
| 2016/0206858 A1 | 7/2016 | Ishida |
| 2016/0220161 A1 | 8/2016 | Goral et al. |
| 2016/0220786 A1 | 8/2016 | Mitchell et al. |
| 2016/0256667 A1 | 9/2016 | Ribelin et al. |
| 2016/0296729 A1 | 10/2016 | Fuchs et al. |
| 2016/0310704 A1* | 10/2016 | Ng ................... A61M 25/0009 |
| 2016/0331937 A1 | 11/2016 | Teoh |
| 2016/0331938 A1 | 11/2016 | Blanchard et al. |
| 2016/0354580 A1 | 12/2016 | Teoh et al. |
| 2016/0361490 A1 | 12/2016 | Phang et al. |
| 2016/0361519 A1 | 12/2016 | Teoh et al. |
| 2017/0000982 A1 | 1/2017 | Ishida |
| 2017/0035992 A1 | 2/2017 | Harding et al. |
| 2017/0043132 A1 | 2/2017 | Ishida |
| 2017/0080205 A1 | 3/2017 | Lauer |
| 2017/0087338 A1 | 3/2017 | Belson |
| 2017/0136217 A1 | 5/2017 | Riesenberger et al. |
| 2017/0203050 A1 | 7/2017 | Bauer et al. |
| 2017/0209668 A1 | 7/2017 | Belson |
| 2017/0246429 A1 | 8/2017 | Tan et al. |
| 2017/0259036 A1 | 9/2017 | Belson |
| 2017/0274182 A1* | 9/2017 | O'Bryan ............ A61M 25/0631 |
| 2017/0361071 A1 | 12/2017 | Belson |
| 2018/0028780 A1 | 2/2018 | Blanchard et al. |
| 2018/0071509 A1* | 3/2018 | Tran ................... A61M 25/0097 |
| 2018/0099123 A1 | 4/2018 | Woehr |
| 2018/0126125 A1 | 5/2018 | Hall et al. |
| 2018/0133437 A1 | 5/2018 | Blanchard |
| 2018/0229003 A1 | 8/2018 | Blanchard et al. |
| 2018/0229004 A1 | 8/2018 | Blanchard et al. |
| 2018/0280626 A1* | 10/2018 | Branson ............ A61M 25/0631 |
| 2018/0296772 A1* | 10/2018 | Chu ................... A61M 5/002 |
| 2019/0022358 A1 | 1/2019 | Belson |
| 2019/0030292 A1* | 1/2019 | Isaacson ............ A61M 25/0618 |
| 2019/0192829 A1 | 6/2019 | Belson et al. |
| 2019/0201667 A1 | 7/2019 | Braithwaite et al. |
| 2019/0240459 A1 | 8/2019 | Belson |
| 2019/0275303 A1 | 9/2019 | Tran et al. |
| 2019/0282785 A1* | 9/2019 | Tamai ............... A61M 25/0637 |
| 2019/0307986 A1 | 10/2019 | Belson |
| 2019/0351193 A1 | 11/2019 | Hall |
| 2019/0351196 A1 | 11/2019 | Ribelin et al. |
| 2020/0001051 A1 | 1/2020 | Huang et al. |
| 2020/0094037 A1 | 3/2020 | Tran et al. |
| 2020/0261696 A1 | 8/2020 | Blanchard |
| 2020/0261703 A1 | 8/2020 | Belson et al. |
| 2020/0316347 A1 | 10/2020 | Belson |
| 2021/0052858 A1 | 2/2021 | Isaacson et al. |
| 2021/0308428 A1 | 10/2021 | Blanchard et al. |
| 2021/0402155 A1 | 12/2021 | Hall et al. |
| 2022/0362523 A1 | 11/2022 | Huang et al. |
| 2023/0398345 A1 | 12/2023 | Tran et al. |
| 2024/0189552 A1 | 6/2024 | Ribelin et al. |
| 2024/0207584 A1 | 6/2024 | Belson et al. |
| 2024/0390652 A1 | 11/2024 | Blanchard |
| 2025/0099718 A1 | 3/2025 | Tran |

FOREIGN PATENT DOCUMENTS

| | | | |
|---|---|---|---|
| CA | 2206085 A1 * | 12/1997 | ........ A61M 25/0693 |
| CN | 1178707 A | 4/1998 | |
| CN | 1319023 A | 10/2001 | |
| CN | 1523970 A | 8/2004 | |
| CN | 1871043 A | 11/2006 | |
| CN | 101242868 A | 8/2008 | |
| CN | 101293122 A | 10/2008 | |
| CN | 101417159 A | 4/2009 | |
| CN | 101784300 A | 7/2010 | |

(56) References Cited

FOREIGN PATENT DOCUMENTS

| | | | |
|---|---|---|---|
| CN | 102099075 A | 6/2011 | |
| CN | 102939129 A | 2/2013 | |
| CN | 104689456 A | 6/2015 | |
| CN | 105073174 A | 11/2015 | |
| CN | 105188826 A | 12/2015 | |
| CN | 105705191 A | 6/2016 | |
| DE | 20210394 U1 | 9/2002 | |
| EP | 0314470 A2 | 5/1989 | |
| EP | 417764 A1 | 3/1991 | |
| EP | 475857 A1 | 3/1992 | |
| EP | 515710 A1 | 12/1992 | |
| EP | 567321 A2 | 10/1993 | |
| EP | 652020 A2 | 5/1995 | |
| EP | 0730880 A1 | 9/1996 | |
| EP | 747075 A2 | 12/1996 | |
| EP | 750916 A2 | 1/1997 | |
| EP | 778043 A1 | 6/1997 | |
| EP | 800790 A2 | 10/1997 | |
| EP | 832663 A2 | 4/1998 | |
| EP | 910988 A1 | 4/1999 | |
| EP | 942761 A1 | 9/1999 | |
| EP | 1075850 A2 | 2/2001 | |
| EP | 1378263 A2 | 1/2004 | |
| EP | 1418971 A2 | 5/2004 | |
| EP | 1457229 A1 | 9/2004 | |
| EP | 1611916 A1 | 1/2006 | |
| EP | 1907042 A2 | 4/2008 | |
| EP | 1974765 A1 | 10/2008 | |
| EP | 2150304 A2 | 2/2010 | |
| EP | 2272432 A1 | 1/2011 | |
| EP | 2347785 A1 | 7/2011 | |
| EP | 2569046 A1 | 3/2013 | |
| GB | 2529270 A | 2/2016 | |
| JP | 2003-159334 A | 6/2003 | |
| JP | 2004-130074 A | 4/2004 | |
| JP | 2004-223252 A | 8/2004 | |
| JP | 2005-137888 A | 6/2005 | |
| JP | 2009-500129 A | 1/2009 | |
| JP | 2010-088521 A | 4/2010 | |
| JP | 2013-529111 A | 7/2013 | |
| JP | 2018-118079 A | 8/2018 | |
| JP | 6692869 B2 | 5/2020 | |
| WO | 83/01575 A1 | 5/1983 | |
| WO | 1992013584 A1 | 8/1992 | |
| WO | 92/22344 A1 | 12/1992 | |
| WO | 1994006681 A2 | 3/1994 | |
| WO | 1995011710 A1 | 5/1995 | |
| WO | 95/19193 A1 | 7/1995 | |
| WO | 95/23003 A1 | 8/1995 | |
| WO | 96/32981 A1 | 10/1996 | |
| WO | 1996040359 A1 | 12/1996 | |
| WO | 97/05912 A2 | 2/1997 | |
| WO | 97/21458 A1 | 6/1997 | |
| WO | 1997045151 A1 | 12/1997 | |
| WO | 98/24494 A1 | 6/1998 | |
| WO | 1998030268 A1 | 7/1998 | |
| WO | 1998053875 A1 | 12/1998 | |
| WO | 1999008742 A1 | 2/1999 | |
| WO | 1999026682 A1 | 6/1999 | |
| WO | 00/06226 A1 | 2/2000 | |
| WO | 00/12160 A1 | 3/2000 | |
| WO | 2000012167 A1 | 3/2000 | |
| WO | 00/47256 A1 | 8/2000 | |
| WO | 00/67829 A1 | 11/2000 | |
| WO | 2001007103 A1 | 2/2001 | |
| WO | 01/26725 A1 | 4/2001 | |
| WO | WO-0241932 A2 * | 5/2002 | ......... A61M 25/065 |
| WO | 02/066093 A2 | 8/2002 | |
| WO | 02076526 A2 | 10/2002 | |
| WO | 03/11381 A1 | 2/2003 | |
| WO | 03/043686 A1 | 5/2003 | |
| WO | 03/047675 A2 | 6/2003 | |
| WO | 2004/018031 A2 | 3/2004 | |
| WO | 2005002659 A1 | 1/2005 | |
| WO | 2004106203 A3 | 3/2005 | |
| WO | 2005/074412 A2 | 8/2005 | |
| WO | 2005/087306 A1 | 9/2005 | |
| WO | 2006062996 A2 | 6/2006 | |
| WO | WO-2006070358 A2 * | 7/2006 | ........ A61M 25/0606 |
| WO | 2007/006055 A2 | 1/2007 | |
| WO | 2007/032343 A1 | 3/2007 | |
| WO | 2007094841 A1 | 8/2007 | |
| WO | 2007098355 A1 | 8/2007 | |
| WO | 2007098359 A1 | 8/2007 | |
| WO | 2008005618 A2 | 1/2008 | |
| WO | 2008030999 A2 | 3/2008 | |
| WO | 2008/131300 A2 | 10/2008 | |
| WO | 2008/137956 A2 | 11/2008 | |
| WO | 2009/001309 A1 | 12/2008 | |
| WO | 2008147600 A1 | 12/2008 | |
| WO | 2009031161 A1 | 3/2009 | |
| WO | 2009114837 A2 | 9/2009 | |
| WO | 2009/124990 A1 | 10/2009 | |
| WO | 2010015676 A1 | 2/2010 | |
| WO | 2010/048449 A2 | 4/2010 | |
| WO | 2010/132608 A2 | 11/2010 | |
| WO | 2011036574 A1 | 3/2011 | |
| WO | 2011/143621 A1 | 11/2011 | |
| WO | 2012037213 A1 | 3/2012 | |
| WO | 2012106266 A1 | 8/2012 | |
| WO | 2012154277 A1 | 11/2012 | |
| WO | 2012166746 A1 | 12/2012 | |
| WO | 2012174109 A1 | 12/2012 | |
| WO | 2013119557 A1 | 8/2013 | |
| WO | 2013126446 A1 | 8/2013 | |
| WO | 2013187827 A1 | 12/2013 | |
| WO | 2014006403 A1 | 1/2014 | |
| WO | 2014029424 A1 | 2/2014 | |
| WO | 2014074417 A2 | 5/2014 | |
| WO | 2014081942 A1 | 5/2014 | |
| WO | 2014/123848 A1 | 8/2014 | |
| WO | 2014120741 A1 | 8/2014 | |
| WO | 2014133617 A1 | 9/2014 | |
| WO | 2014140257 A1 | 9/2014 | |
| WO | 2014140265 A1 | 9/2014 | |
| WO | 2014/165783 A1 | 10/2014 | |
| WO | 2014158908 A1 | 10/2014 | |
| WO | 2014182421 A1 | 11/2014 | |
| WO | 2014197656 A1 | 12/2014 | |
| WO | 2014204593 A1 | 12/2014 | |
| WO | 2015017136 A1 | 2/2015 | |
| WO | 2015024904 A1 | 2/2015 | |
| WO | 2015035393 A1 | 3/2015 | |
| WO | 2015058136 A1 | 4/2015 | |
| WO | 15108913 A1 | 7/2015 | |
| WO | 2015/168655 A2 | 11/2015 | |
| WO | 15164912 A1 | 11/2015 | |
| WO | 2016/037127 A1 | 3/2016 | |
| WO | 16178974 A1 | 11/2016 | |
| WO | 2018/049413 A1 | 3/2018 | |
| WO | 2018157339 A1 * | 9/2018 | |
| WO | 2018170349 A1 | 9/2018 | |
| WO | 2019173641 A1 | 9/2019 | |
| WO | 2022250956 A1 | 12/2022 | |
| WO | 2024249359 A1 | 12/2024 | |

OTHER PUBLICATIONS

Access Scientific, The Powerwand® Extended Dwell Catheter Brochure (http://accessscientific.com/media/4Fr-POWERWAND-Brochure.pdf) last accessed Sep. 25, 2015.
BD Angiocath™ Autoguard™ Shielded IV Catheter Brochure, © 2001.
BD Medical Systems, I.V. Catheter Family Brochure (2006).
BD Saf-T-Intima™ Integrated Safety IV Catheter Brochure, © 2001.
Becton Dickinson, Insyte® AutoGuard™ Shielded I.V. Catheter Brochure, 1998.
CA 2,799,360 filed May 13, 2011 Office Action dated Jun. 7, 2017.
CN 201180029526.7 filed Dec. 14, 2012 First Office Action dated Apr. 21, 2014.
CN 2012800008866.6 filed Aug. 14, 2013 Second Office Action dated Aug. 17, 2015.

(56) References Cited

OTHER PUBLICATIONS

CN 201280008866.6 filed Aug. 14, 2013 First Office Action dated Dec. 31, 2014.
CN 201280008866.6 filed Aug. 14, 2013 Third Office Action dated Jan. 25, 2016.
CN 201380073657.4 filed Aug. 21, 2015 Office Action dated Jun. 28, 2017.
CN 201380073657.4 filed Aug. 21, 2015 Office Action dated Mar. 2, 2018.
CN 201480019467.9 filed Sep. 29, 2015 Office Action dated Apr. 6, 2017.
CN 201510079782.7 filed Feb. 13, 2015 Office Action dated Dec. 30, 2016.
CN 201510079782.7 filed Feb. 13, 2015 Office Action dated Feb. 5, 2018.
CN 201510079782.7 filed Feb. 13, 2015 Office Action dated Sep. 19, 2017.
CN 201580022407.7 filed Nov. 2, 2016 Office Action dated Jan. 31, 2019.
CN 201580022407.7 filed Nov. 2, 2016 Office Action dated Sep. 16, 2019.
Cook Medical "Lunderquist Extra-Stiff wire guide" (2012).
Endovascular Today "Coiled Stainless Steel Guidewires" Buyer's Guide pp. 13-20, (2012).
EP 07783404.2 filed Jan. 19, 2009 Office Action dated Apr. 16, 2019.
EP 07783404.2 filed Jan. 19, 2009 Office Action dated Mar. 7, 2018.
EP 10075422.5 filed Jul. 5, 2008 European search report and written opinion dated Dec. 1, 2010.
EP 11781384.0 filed Sep. 21, 2012 Extended European Search Report dated Oct. 31, 2017.
EP 12782187.4 filed Sep. 10, 2013 European search report and written opinion dated Aug. 30, 2016.
EP 12782187.4 filed Sep. 10, 2013 European search report and written opinion dated Dec. 17, 2015.
EP 12782187.4 filed Sep. 10, 2013 Office Action dated Apr. 24, 2018.
EP 12782187.4 filed Sep. 10, 2013 Office Action dated Nov. 28, 2018.
EP 13876666.2 filed Sep. 7, 2015 Extended European Search Report dated Sep. 20, 2016.
EP 15785819.2 filed Dec. 2, 2016 Extended European Search Report dated Dec. 4, 2017.
EP 16797029.2 filed Nov. 21, 2017 Extended European Search Report dated May 3, 2018.
EP 16797029.2 filed Nov. 21, 2017 Office Action dated Mar. 27, 2020.
EP 16797047.4 filed Dec. 6, 2017 Supplemental European Search Report dated Jan. 9, 2019.
EP 19181963.0 filed Jun. 24, 2019 Extended European Search Report dated Jul. 16, 2019.
EP17849786.3 filed Apr. 12, 2019 Extended European Search Report dated May 13, 2020.
European office action dated Apr. 21, 2008 for EP Application No. 06800027.2.
European office action dated Aug. 6, 2012 for EP Application No. 07783404.2.
European office action dated Oct. 5, 2010 for EP Application No. 07783404.2.
European search report and opinion dated Jul. 10, 2009 for EP Application No. 07783404.2.
Hadaway, Lynn C., A Midline Alternative to Central and Peripheral Venous Access, Caring Magazine, May 1990, pp. 45-50.
International search report and written opinion dated Apr. 2, 2012 for PCT/US2012/023192.
International search report and written opinion dated Jun. 1, 2007 for PCT/US2006/026671.
International search report and written opinion dated Oct. 23, 2008 for PCT/US2007/068393.
JP 2013-510353 filed Oct. 31, 2012 First Office Action dated Feb. 19, 2015.
JP 2013-510353 filed Oct. 31, 2012 Office Action dated Dec. 15, 2016.
JP 2013-510353 filed Oct. 31, 2012 Second Office Action dated Jan. 28, 2016.
JP 2015-560173 filed Aug. 28, 2015 Office Action dated Aug. 2, 2018.
JP 2015-560173 filed Aug. 28, 2015 Office Action dated Sep. 19, 2017.
JP 2016-107046 filed May 30, 2016 Office Action dated Apr. 26, 2017.
EP 24156803.9 filed May 12, 2022 Extended European Search Report dated Jun. 24, 2024.
PCT/US2019/021231 filed Oct. 6, 2020 Supplementary European Search Report dated May 28, 2021.
U.S. Appl. No. 16/902,031, filed Jun. 15, 2020 Final Office Action dated Apr. 26, 2024.
U.S. Appl. No. 17/353,602, filed Jun. 21, 2021 Non-Final Office Action dated Feb. 1, 2024.
U.S. Appl. No. 17/353,602, filed Jun. 21, 2021 Notice of Allowance dated Aug. 7, 2024.
U.S. Appl. No. 17/863,179, filed Jul. 12, 2022 Notice of Allowance dated Feb. 13, 2024.
U.S. Appl. No. 17/877,502, filed Jul. 29, 2022 Non-Final Office Action dated Apr. 16, 2024.
U.S. Appl. No. 16/295,906, filed Mar. 7, 2019 Non-Final Office Action dated Sep. 4, 2020.
U.S. Appl. No. 16/295,906, filed Mar. 7, 2019 Notice of Allowance dated Mar. 4, 2021.
U.S. Appl. No. 16/296,087, filed Mar. 7, 2019 Final Office Action dated Sep. 10, 2021.
U.S. Appl. No. 16/296,087, filed Mar. 7, 2019 Non-Final Office Action dated Mar. 26, 2021.
U.S. Appl. No. 16/296,087, filed Mar. 7, 2019 Notice of Allowance dated Mar. 8, 2022.
U.S. Appl. No. 16/296,087, filed Mar. 7, 2019 Restriction Requirement dated Feb. 8, 2021.
U.S. Appl. No. 16/389,719, filed Apr. 19, 2019 Non-Final Office Action dated Mar. 19, 2021.
U.S. Appl. No. 16/450,800, filed Jun. 24, 2019 Non-Final Office Action dated Jul. 9, 2021.
U.S. Appl. No. 16/450,800, filed Jun. 24, 2019 Notice of Allowance dated Nov. 3, 2021.
U.S. Appl. No. 16/490,023, filed Aug. 29, 2019 Non-Final Office Action dated Oct. 4, 2021.
U.S. Appl. No. 16/490,023, filed Aug. 29, 2019 Notice of Allowance dated Mar. 14, 2022.
U.S. Appl. No. 16/490,023, filed Aug. 29, 2019 Restriction Requirement dated May 4, 2021.
U.S. Appl. No. 16/529,602, filed Aug. 1, 2019 Notice of Allowance dated Jan. 19, 2021.
U.S. Appl. No. 16/529,622, filed Aug. 1, 2019 Non-Final Office Action dated May 7, 2021.
U.S. Appl. No. 16/529,622, filed Aug. 1, 2019 Notice of Allowance dated Aug. 23, 2021.
U.S. Appl. No. 16/868,461, filed May 6, 2020 Final Office Action dated May 25, 2022.
U.S. Appl. No. 16/868,461, filed May 6, 2020 Non-Final Office Action dated Feb. 15, 2022.
U.S. Appl. No. 16/996,769, filed Aug. 18, 2020 Non-Final Office Action dated Mar. 2, 2022.
U.S. Appl. No. 29/536,043, filed Aug. 12, 2015 Final Office Action dated Mar. 26, 2018.
U.S. Appl. No. 29/536,043, filed Aug. 12, 2015 Non-Final Office Action dated Aug. 31, 2017.
U.S. Appl. No. 29/545,436, filed Nov. 12, 2015 Final Office Action dated Mar. 26, 2018.
U.S. Appl. No. 29/545,436, filed Nov. 12, 2015 Non-Final Office Action dated Sep. 12, 2017.
U.S. Appl. No. 29/654,521, filed Jun. 25, 2018 Notice of Allowability dated Sep. 30, 2020.

(56) References Cited

OTHER PUBLICATIONS

U.S. Appl. No. 29/654,521, filed Jun. 25, 2018 Notice of Allowance dated Aug. 17, 2020.
U.S. Appl. No. 29/654,521, filed Jun. 25, 2018 Restriction Requirement dated Apr. 8, 2020.
U.S. Appl. No. 29/654,527, filed Jun. 25, 2018 Notice of Allowability dated Sep. 30, 2020.
U.S. Appl. No. 29/654,527, filed Jun. 25, 2018 Notice of Allowance dated Aug. 18, 2020.
U.S. Appl. No. 29/654,527, filed Jun. 25, 2018 Restriction Requirement dated Mar. 10, 2020.
U.S. Appl. No. 29/658,136, filed Jul. 27, 2018 Non-Final Office Action dated Sep. 9, 2020.
U.S. Appl. No. 29/658,136, filed Jul. 27, 2018 Notice of Allowance dated Mar. 23, 2021.
U.S. Appl. No. 29/658,136, filed Jul. 27, 2018 Restriction Requirement dated May 11, 2020.
Waltimire, B. and Rasor, J.S., Midline catheter: Virtually bloodless insertion technique and needle safety tube minimize potential for transmission of bloodborne disease. Sponsored by national Foundation for Infectious Diseases. 5th National forum on AIDS, Hepatitis, and other blood-borne diseases. Atlanta, GA, Mar. 1992.
EP 22192364.2 filed Aug. 26, 2022 Extended European Search Report dated Nov. 30, 2022.
U.S. Appl. No. 16/696,844, filed Nov. 26, 2019 Notice of Allowance dated Apr. 17, 2023.
U.S. Appl. No. 16/867,349, filed May 5, 2020 Advisory Action dated Mar. 13, 2023.
U.S. Appl. No. 16/867,349, filed May 5, 2020 Final Office Action dated Dec. 28, 2022.
U.S. Appl. No. 16/868,461, filed May 6, 2020 Examiner's Answer dated Jan. 31, 2023.
U.S. Appl. No. 16/902,031, filed Jun. 15, 2020 Non-Final Office Action dated Dec. 21, 2022.
U.S. Appl. No. 17/164,653, filed Feb. 1, 2021, Notice of Allowance dated Nov. 1, 2022.
U.S. Appl. No. 17/164,653, filed Feb. 1, 2021, Restriction Requirement dated Sep. 7, 2022.
U.S. Appl. No. 17/337,273, filed Jun. 2, 2021 Notice of Allowance dated Oct. 5, 2022.
U.S. Appl. No. 17/353,602, filed Jun. 21, 2021 Non-Final Office Action dated Mar. 30, 2023.
U.S. Appl. No. 17/471,051, filed Sep. 9, 2021 Restriction Requirement dated Dec. 22, 2022.
U.S. Appl. No. 17/863,179, filed Jul. 12, 2022 Non-Final Office Action dated Dec. 7, 2022.
U.S. Appl. No. 14/866,738, filed Sep. 25, 2015 Non-Final Office Action dated Nov. 6, 2017.
U.S. Appl. No. 14/866,738, filed Sep. 25, 2015 Non-Final Office Action dated Oct. 31, 2016.
U.S. Appl. No. 14/866,738, filed Sep. 25, 2015 Notice of Allowance dated Sep. 24, 2020.
U.S. Appl. No. 14/866,738, filed Sep. 25, 2015 Notice of Panel Decision dated Jun. 23, 2017.
U.S. Appl. No. 14/866,738, filed Sep. 25, 2015 Patent Board Decision dated Jul. 13, 2020.
U.S. Appl. No. 14/876,735, filed Oct. 6, 2015 Non-Final Office Action dated Mar. 30, 2017.
U.S. Appl. No. 15/154,384, filed May 13, 2016 Final Office Action dated Dec. 24, 2020.
U.S. Appl. No. 15/154,384, filed May 13, 2016 Final Office Action dated Nov. 27, 2019.
U.S. Appl. No. 15/154,384, filed May 13, 2016 Non-Final Office Action dated Jun. 26, 2020.
U.S. Appl. No. 15/154,384, filed May 13, 2016 Non-Final Office Action dated Jun. 28, 2019.
U.S. Appl. No. 15/154,384, filed May 13, 2016 Notice of Allowance dated Apr. 29, 2021.
U.S. Appl. No. 15/154,384, filed May 13, 2016 Notice of Allowance dated Mar. 17, 2021.
U.S. Appl. No. 15/154,384, filed May 13, 2016 Restriction Requirement dated Jan. 25, 2019.
U.S. Appl. No. 15/154,808, filed May 13, 2016 Advisory Action dated Oct. 26, 2018.
U.S. Appl. No. 15/154,808, filed May 13, 2016 Final Office Action dated Aug. 16, 2018.
U.S. Appl. No. 15/154,808, filed May 13, 2016 Non-Final Office Action dated Apr. 6, 2018.
U.S. Appl. No. 15/154,808, filed May 13, 2016 Notice of Allowance dated Apr. 16, 2019.
U.S. Appl. No. 15/154,808, filed May 13, 2016 Restriction Requirement dated Jan. 3, 2018.
U.S. Appl. No. 15/377,880, filed Dec. 13, 2016 Final Office Action dated Oct. 19, 2018.
U.S. Appl. No. 15/481,773, filed Apr. 7, 2017 Final Office Action dated Jan. 10, 2019.
U.S. Appl. No. 15/481,773, filed Apr. 7, 2017 Non-Final Office Action dated Jun. 29, 2018.
U.S. Appl. No. 15/608,802, filed May 30, 2017 Non-Final Office Action dated Jun. 6, 2019.
U.S. Appl. No. 15/692,915, filed Aug. 31, 2017 Non-Final Office Action dated Jan. 29, 2018.
U.S. Appl. No. 15/702,537, filed Sep. 12, 2017 Final Office Action dated Mar. 8, 2019.
U.S. Appl. No. 15/702,537, filed Sep. 12, 2017 Non-Final Office Action dated Nov. 29, 2018.
U.S. Appl. No. 15/702,537, filed Sep. 12, 2017 Notice of Allowance dated Jul. 31, 2019.
U.S. Appl. No. 15/727,528, filed Oct. 6, 2017 Final Office Action dated Jan. 28, 2020.
U.S. Appl. No. 15/727,528, filed Oct. 6, 2017 Non-Final Office Action dated Sep. 20, 2019.
U.S. Appl. No. 15/727,528, filed Oct. 6, 2017 Restriction Requirement dated Aug. 7, 2019.
U.S. Appl. No. 15/727,528, filed Oct. 6, 2017 Notice of Allowance dated Mar. 27, 2020.
U.S. Appl. No. 15/862,380, filed Jan. 4, 2018 Final Office Action dated Oct. 26, 2020.
U.S. Appl. No. 15/862,380, filed Jan. 4, 2018 Non-Final Office Action dated Jul. 9, 2020.
U.S. Appl. No. 15/862,380, filed Jan. 4, 2018 Notice of Allowance dated Jun. 16, 2021.
U.S. Appl. No. 15/862,380, filed Jan. 4, 2018 Restriction Requirement dated Dec. 23, 2019.
U.S. Appl. No. 15/869,872, filed Jan. 12, 2018 Advisory Action dated Sep. 23, 2020.
U.S. Appl. No. 15/869,872, filed Jan. 12, 2018 Final Office Action dated Jun. 25, 2020.
U.S. Appl. No. 15/869,872, filed Jan. 12, 2018 Notice of Allowance dated Dec. 24, 2021.
U.S. Appl. No. 15/869,872, filed Jan. 12, 2018 Non-Final Office Action dated Apr. 10, 2020.
U.S. Appl. No. 15/951,931, filed Apr. 12, 2018 Non-Final Office Action dated Nov. 19, 2019.
U.S. Appl. No. 15/951,931, filed Apr. 12, 2018 Notice of Allowance dated Feb. 20, 2020.
U.S. Appl. No. 15/951,931, filed Apr. 12, 2018 Notice of Allowability dated Apr. 16, 2020.
U.S. Appl. No. 15/951,954, filed Apr. 12, 2018 Non-Final Office Action dated Nov. 4, 2019.
U.S. Appl. No. 15/951,954, filed Apr. 12, 2018 Notice of Allowability dated Apr. 7, 2020.
U.S. Appl. No. 16/138,523, filed Sep. 21, 2018 Notice of Allowance dated Mar. 26, 2020.
U.S. Appl. No. 16/292,076, filed Mar. 4, 2019 Corrected Notice of Allowance dated Feb. 25, 2021.
U.S. Appl. No. 16/292,076, filed Mar. 4, 2019 Non-Final Office Action dated Aug. 10, 2020.
U.S. Appl. No. 16/292,076, filed Mar. 4, 2019 Notice of Allowance dated Feb. 4, 2021.
U.S. Appl. No. 16/295,906, filed Mar. 7, 2019 Final Office Action dated Dec. 22, 2020.

(56) References Cited

OTHER PUBLICATIONS

EP 22159383.3 filed Mar. 1, 2022 Extended European Search Report dated May 30, 2022.
PCT/US2020/046860 filed Aug. 18, 2020 International Search Report and Written Opinion dated Nov. 18, 2020.
U.S. Appl. No. 16/696,844, filed Nov. 26, 2019 Non-Final Office Action dated Aug. 1, 2022.
U.S. Appl. No. 16/867,349, filed May 5, 2020 Non-Final Office Action dated Jun. 16, 2022.
U.S. Appl. No. 16/996,769, filed Aug. 18, 2020 Notice of Allowance dated Jun. 13, 2022.
JP 2016-107046 filed May 30, 2016 Office Action dated Jul. 28, 2016.
JP 2016-107046 filed May 30, 2016 Office Action dated Nov. 7, 2017.
JP 2016-563441 filed Oct. 19, 2016 Office Action dated Jan. 25, 2019.
JP 2018-039302 filed Mar. 6, 2018 Office Action dated Feb. 20, 2019.
Menlo Care, Landmark® Midline Catheter Maintenance and Reference Guide (1993).
Menlo Care, Landmark® Midline Catheters Brochure, 1991.
Menlo Care, Landmark® Venous Access Device Insertion Instructions (1992).
Menlo Care, Landmark™ Aquavene® Catheters Brochure, 1992.
Menlo Care, Publications on Aquavene® Technology, Aug. 1992.
Notice of allowance dated Jan. 29, 2014 for U.S. Appl. No. 12/307,519.
Notice of allowance dated Jun. 10, 2015 for U.S. Appl. No. 11/577,491.
Office action dated Mar. 10, 2011 for U.S. Appl. No. 12/307,519.
Office action dated Mar. 27, 2013 for U.S. Appl. No. 13/358,099.
Office action dated Oct. 25, 2010 for U.S. Appl. No. 12/307,519.
PCT/CN2017/075370 filed Mar. 1, 2017 International Search Report and Written Opinion dated Nov. 30, 2017.
PCT/US15/28950 filed May 1, 2015 International Search Report and Written Opinion dated Oct. 19, 2015.
PCT/US2008/062954 filed May 7, 2008 International search report and written opinion dated Jan. 16, 2009.
PCT/US2011/036530 filed May 13, 2011 International Search Report dated Oct. 6, 2011.
PCT/US2011/036530 filed May 13, 2011 Written Opinion of the International Searching Authority dated Oct. 6, 2011.
PCT/US2012/026618 International Preliminary Report on Patentability dated Aug. 27, 2013.
PCT/US2012/026618 International Search Report and Written Opinion dated Jun. 25, 2012.
PCT/US2013/073577 filed Dec. 6, 2013 International Search Report and Written Opinion dated Feb. 24, 2014.
PCT/US2014/013557 filed Jan. 29, 2014 International search report and written opinion dated Apr. 14, 2014.
PCT/US2015/048676 filed Sep. 4, 2015 International search report and written opinion dated Dec. 4, 2015.
PR Newswire, Luther Medical Products, Inc. Receives Approval to Supply Improved Neonatal Product to Japan, Aug. 20, 1998.
Rasor, Julia S, Review of Catheter-related infection rates: comparison of conventional catheter materials with Aquavene®, JVAN vol. 1, No. 3, Spring 1991.
RU 2017141812 filed Nov. 30, 2017 Office Action dated Jan. 31, 2018.
SG 11201709185X filed Nov. 8, 2017 Office Action dated Oct. 5, 2018.
SG 11201709193S filed Nov. 8, 2017 Office Action dated Oct. 5, 2018.
U.S. Appl. No. 12/598,053, filed Apr. 20, 2010 Office action dated Dec. 4, 2012.
U.S. Appl. No. 13/107,781, filed May 13, 2011 Final Office Action dated Jul. 18, 2014.
U.S. Appl. No. 13/107,781, filed May 13, 2011 Non-Final Office Action dated Dec. 30, 2013.
U.S. Appl. No. 13/405,096, filed Feb. 24, 2012 Advisory Action dated Apr. 18, 2014.
U.S. Appl. No. 13/405,096, filed Feb. 24, 2012 Final Office Action dated Jan. 31, 2014.
U.S. Appl. No. 13/405,096, filed Feb. 24, 2012 Non-Final Office Action dated Aug. 20, 2013.
U.S. Appl. No. 13/405,096, filed Feb. 24, 2012 Non-Final Office Action dated Nov. 18, 2014.
EP 24185948.7 filed Jul. 2, 2024 Extended European Search Report dated Oct. 4, 2024.
PCT/US2024/031131 filed May 24, 2024 International Search Report and Written Opinion dated Sep. 20, 2024.
U.S. Appl. No. 16/902,031, filed Jun. 15, 2020 Examiner's Answer dated Nov. 7, 2024.
U.S. Appl. No. 17/877,502, filed Jul. 29, 2022 Final Office Action dated Nov. 7, 2024.
U.S. Appl. No. 18/443,030, filed Feb. 15, 2024 Final Office Action dated Nov. 7, 2024.
U.S. Appl. No. 18/443,030, filed Feb. 15, 2024 Non-Final Office Action dated Aug. 28, 2024.
U.S. Appl. No. 18/601,899, filed Mar. 11, 2024 Non-Final Office Action dated Dec. 10, 2024.
U.S. Appl. No. 29/757,778, filed Nov. 9, 2020 Restriction Requirement dated Oct. 17, 2024.
U.S. Appl. No. 29/757,781, filed Nov. 9, 2020 Restriction Requirement dated Oct. 17, 2024.
EP 20855351.1 filed Mar. 7, 2022 Extended European Search Report dated Sep. 7, 2023.
U.S. Appl. No. 16/867,349, filed May 5, 2020 Non-Final Office Action dated Jul. 20, 2023.
U.S. Appl. No. 16/867,349, filed May 5, 2020 Notice of Allowance dated Oct. 24, 2023.
U.S. Appl. No. 16/902,031, filed Jun. 15, 2020 Advisory Action dated Oct. 25, 2023.
U.S. Appl. No. 16/902,031, filed Jun. 15, 2020 Final Office Action dated Aug. 18, 2023.
U.S. Appl. No. 16/902,031, filed Jun. 15, 2020 Non-Final Office Action dated Jan. 17, 2024.
U.S. Appl. No. 17/353,602, filed Jun. 21, 2021 Advisory Action dated Dec. 26, 2023.
U.S. Appl. No. 17/353,602, filed Jun. 21, 2021 Final Office Action dated Sep. 28, 2023.
U.S. Appl. No. 17/471,051, filed Sep. 9, 2021 Final Office Action dated Aug. 23, 2023.
U.S. Appl. No. 17/471,051, filed Sep. 9, 2021 Non-Final Office Action dated May 24, 2023.
U.S. Appl. No. 17/471,051, filed Sep. 9, 2021 Notice of Allowance dated Nov. 22, 2023.
U.S. Appl. No. 17/493,806, filed Oct. 4, 2021 Non-Final Office Action dated Jul. 31, 2023.
U.S. Appl. No. 17/493,806, filed Oct. 4, 2021 Notice of Allowance dated Oct. 31, 2023.
U.S. Appl. No. 17/863,179, filed Jul. 12, 2022 Advisory Action dated Aug. 23, 2023.
U.S. Appl. No. 17/863,179 filed Jul. 12, 2022 Final Office Action dated Jun. 14, 2023.
U.S. Appl. No. 18/094,917, filed Jan. 9, 2023 Non-Final Office Action dated Jun. 8, 2023.
U.S. Appl. No. 18/094,917, filed Jan. 9, 2023 Notice of Allowance dated Sep. 13, 2023.
U.S. Appl. No. 13/405,096, filed Feb. 24, 2012 Notice of Allowance dated Mar. 11, 2015.
U.S. Appl. No. 14/044,623, filed Oct. 2, 2013 Notice of Allowance dated Nov. 6, 2014.
U.S. Appl. No. 14/099,050, filed Dec. 6, 2013 Advisory Action dated Jun. 1, 2017.
U.S. Appl. No. 14/099,050, filed Dec. 6, 2013 Final Office Action dated Jan. 30, 2017.
U.S. Appl. No. 14/099,050, filed Dec. 6, 2013 Non-Final Office Action dated Dec. 22, 2015.
U.S. Appl. No. 14/099,050, filed Dec. 6, 2013 Non-Final Office Action dated Jul. 19, 2016.

(56) References Cited

OTHER PUBLICATIONS

U.S. Appl. No. 14/099,050, filed Dec. 6, 2013 Notice of Allowance dated Sep. 14, 2017.
U.S. Appl. No. 14/099,050, filed Dec. 6, 2013 Notice of Panel Decision dated Aug. 1, 2017.
U.S. Appl. No. 14/167,149, filed Jan. 29, 2014 Non-Final Office Action dated Oct. 21, 2015.
U.S. Appl. No. 14/167,149, filed Jan. 29, 2014 Notice of Allowance dated Jul. 6, 2016.
U.S. Appl. No. 14/174,071, filed Feb. 6, 2014 Final Office Action dated Dec. 2, 2016.
U.S. Appl. No. 14/174,071, filed Feb. 6, 2014 Non-Final Office Action dated Jul. 29, 2016.
U.S. Appl. No. 14/174,071, filed Feb. 6, 2014 Non-Final Office Action dated Mar. 31, 2016.
U.S. Appl. No. 14/192,541, filed Feb. 27, 2014 Non-Final Office Action dated Jul. 20, 2016.
U.S. Appl. No. 14/192,541, filed Feb. 27, 2014 Notice of Allowance dated Dec. 6, 2016.
U.S. Appl. No. 14/192,541, filed Feb. 27, 2014 Notice of Corrected Allowability dated Mar. 8, 2017.
U.S. Appl. No. 14/250,093, filed Apr. 10, 2014 Advisory Action dated May 19, 2017.
U.S. Appl. No. 14/250,093, filed Apr. 10, 2014 Examiner's Answer dated Jun. 20, 2018.
U.S. Appl. No. 14/250,093, filed Apr. 10, 2014 Final Office Action dated Mar. 9, 2017.
U.S. Appl. No. 14/250,093, filed Apr. 10, 2014 Final Office Action dated Nov. 6, 2017.
U.S. Appl. No. 14/250,093, filed Apr. 10, 2014 Non-Final Office Action dated Nov. 16, 2016.
U.S. Appl. No. 14/250,093, filed Apr. 10, 2014 Notice of Allowance dated Aug. 19, 2020.
U.S. Appl. No. 14/250,093, filed Apr. 10, 2014 Panel Decision dated Jul. 14, 2017.
U.S. Appl. No. 14/250,093, filed Apr. 10, 2014 Patent Board Decision dated Jun. 8, 2020.
U.S. Appl. No. 14/477,717, filed Sep. 4, 2014, Notice of allowance dated Feb. 17, 2015.
U.S. Appl. No. 14/477,717, filed Sep. 4, 2014, Office action dated Dec. 18, 2014.
U.S. Appl. No. 14/585,800, filed Dec. 30, 2014 Final Office Action dated May 11, 2018.
U.S. Appl. No. 14/585,800, filed Dec. 30, 2014 Non-Final Office Action dated May 16, 2016.
U.S. Appl. No. 14/585,800, filed Dec. 30, 2014 Non-Final Office Action dated Nov. 29, 2016.
U.S. Appl. No. 14/585,800, filed Dec. 30, 2014 Non-Final Office Action dated Nov. 3, 2017.
U.S. Appl. No. 14/585,800, filed Dec. 30, 2014 Non-Final Office Action dated Oct. 8, 2015.
U.S. Appl. No. 14/585,800, filed Dec. 30, 2014 Notice of Allowance dated Feb. 25, 2019.
U.S. Appl. No. 14/585,800, filed Dec. 30, 2014 Notice of Allowance dated Jul. 3, 2017.
U.S. Appl. No. 14/702,580, filed May 1, 2015 Advisory Action dated Nov. 13, 2017.
U.S. Appl. No. 14/702,580, filed May 1, 2015 Final Office Action dated Sep. 1, 2017.
U.S. Appl. No. 14/702,580, filed May 1, 2015 Non-Final Office Action dated May 3, 2017.
U.S. Appl. No. 14/702,580, filed May 1, 2015 Notice of Allowance dated Dec. 8, 2017.
U.S. Appl. No. 14/750,658, filed Jun. 25, 2016 Non-Final Office Action dated Mar. 9, 2017.
U.S. Appl. No. 14/750,658, filed Jun. 25, 2016 Notice of Allowance dated Jul. 20, 2017.
U.S. Appl. No. 14/846,387, filed Sep. 4, 2015 Advisory Action dated May 10, 2018.
U.S. Appl. No. 14/846,387, filed Sep. 4, 2015 Final Office Action dated Mar. 22, 2018.
U.S. Appl. No. 14/846,387, filed Sep. 4, 2015 Non-Final Office Action dated Sep. 22, 2017.
U.S. Appl. No. 14/846,387, filed Sep. 4, 2015 Notice of Allowance dated Oct. 29, 2018.
U.S. Appl. No. 14/866,441, filed Sep. 25, 2015 Advisory Action dated Dec. 22, 2016.
U.S. Appl. No. 14/866,441, filed Sep. 25, 2015 Final Office Action dated Jun. 5, 2018.
U.S. Appl. No. 14/866,441, filed Sep. 25, 2015 Final Office Action dated Sep. 23, 2016.
U.S. Appl. No. 14/866,441, filed Sep. 25, 2015 Non-Final Office Action dated Apr. 7, 2017.
U.S. Appl. No. 14/866,441, filed Sep. 25, 2015 Non-Final Office Action dated Mar. 14, 2016.
U.S. Appl. No. 14/866,441, filed Sep. 25, 2015 Notice of Allowance dated Oct. 17, 2018.
U.S. Appl. No. 14/866,738, filed Sep. 25, 2015 Final Office Action dated Feb. 24, 2017.
U.S. Appl. No. 16/868,461, filed May 6, 2020 Notice of Allowance dated Jan. 21, 2025.
U.S. Appl. No. 17/877,502, filed Jul. 29, 2022 Advisory Action dated Feb. 4, 2025.
U.S. Appl. No. 17/877,502, filed Jul. 29, 2022 Notice of Allowance dated Mar. 7, 2025.
U.S. Appl. No. 18/238,298, filed Aug. 25, 2023 Notice of Allowance dated May 13, 2025.
U.S. Appl. No. 18/443,030, filed Feb. 15, 2024 Advisory Action dated Jan. 10, 2025.
U.S. Appl. No. 18/443,030, filed Feb. 15, 2024 Non-Final Office Action dated May 8, 2025.
U.S. Appl. No. 18/601,899, filed Mar. 11, 2024 Notice of Allowance dated Mar. 26, 2025.
U.S. Appl. No. 29/757,778, filed Nov. 9, 2020 Notice of Allowance dated Dec. 30, 2024.
U.S. Appl. No. 29/757,781, filed Nov. 9, 2020 Ex Parte Quayle Action dated Dec. 19, 2024.
U.S. Appl. No. 29/757,781, filed Nov. 9, 2020 Ex Parte Quayle Action dated Feb. 28, 2025.
U.S. Appl. No. 29/786,807, filed Jun. 2, 2021 Restriction Requirement dated Apr. 14, 2025.
U.S. Appl. No. 18/443,030, filed Feb. 15, 2024 Final Office Action dated Aug. 27, 2025.
U.S. Appl. No. 29/757,781, filed Nov. 9, 2020 Notice of Allowance dated Jul. 16, 2025.
U.S. Appl. No. 29/786,807, filed Jun. 2, 2021 Non-Final Office Action dated Jul. 14, 2025.

* cited by examiner

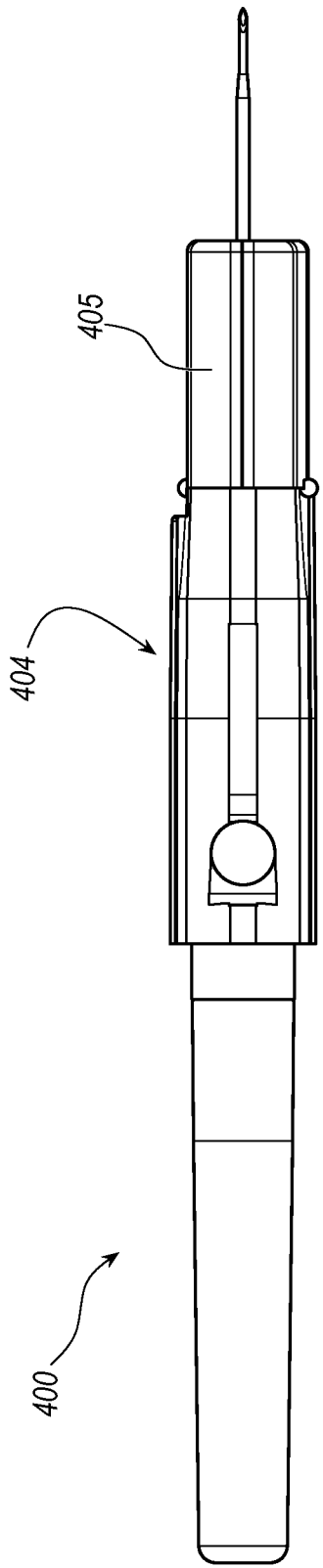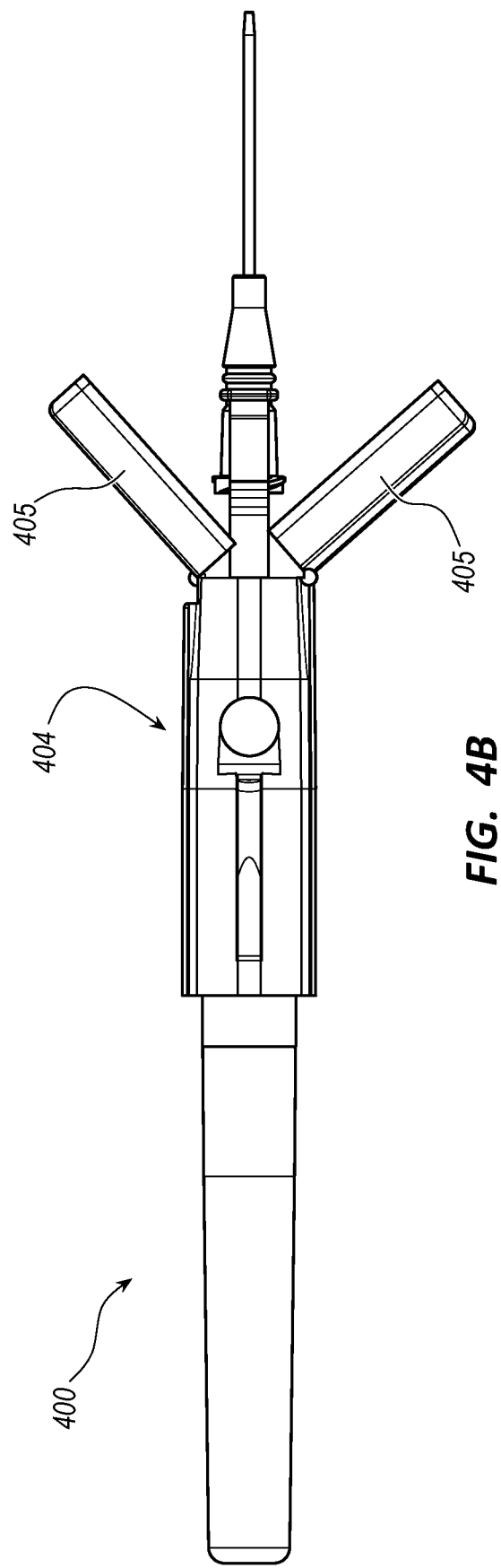

INTRAVENOUS CATHETER-PLACEMENT DEVICE AND METHOD THEREOF

PRIORITY

This application is a U.S. national stage application of International Application No. PCT/US2019/052225, filed Sep. 20, 2019, which is incorporated by reference in its entirety into this application.

BACKGROUND

Existing intravenous ("IV") catheter-placement devices such as that of U.S. Pat. No. 5,685,855 have longer needles than the traditional needles used for venous access. The reason for the longer needles is the IV catheters of the existing IV catheter-placement devices are disposed over the needles thereof, and the IV catheters need to be long enough for placement once venous access is attained. During a typical IV-catheter placement procedure with an existing IV catheter-placement device, however, only a portion of the needle needs to be inserted into a patient such as less than about half a length of the needle before attaining venous access. That said, the length of the needle in the existing IV catheter-placement devices can frighten patients, particularly those with a needle phobia.

Existing IV catheter-placement devices are also used with implanted ports such as the PowerFlow™ Implantable Apheresis IV Port. During a typical procedure for placement of an IV catheter in such an implanted port using an existing IV catheter-placement device, a greater portion of the needle than set forth above needs to be inserted into a patient before attaining venous access through the implanted port. This is because the needle must penetrate subcutaneous tissue and insert into an access funnel of the implanted port. In addition, the IV catheter must be advanced much farther into the access funnel of the implanted port. Depending upon the patient, a length of the IV catheter can be insufficient for placing the IV catheter in the implanted port. For this reason, there is a need for IV catheter-placement devices with longer IV catheters than existing IV catheter-placement devices. However, such IV catheter-placement devices need even longer needles than the existing IV catheter-placement devices, which can further frighten patients.

Disclosed herein is an IV catheter-placement device and method that address the foregoing.

SUMMARY

Disclosed herein is an IV catheter-placement device including, in some embodiments, a cartridge and a case fixedly disposed over the cartridge. The cartridge includes a barrel having a release button on a side of the barrel, a spring-loaded needle extending from a distal-end portion of the barrel, and an IV catheter including a catheter hub slidably disposed over the needle. The case includes a deployment button on a side of the case. The deployment button is configured to slide the IV catheter over the needle. The deployment button is also configured to press the release button when the deployment button slides into the release button. A spring compressed between a needle hub and the distal-end portion of the barrel is released when the deployment button slides into the release button. An entirety of the needle is subsequently launched into a needle cavity of the barrel.

In some embodiments, the deployment button includes a longitudinal extension disposed between the case and the cartridge having a distal end abutting a portion of the catheter hub. The longitudinal extension is configured to slide the IV catheter over the needle.

In some embodiments, the deployment button includes a radial extension. The radial extension is configured to press the release button when the deployment button slides into the release button.

In some embodiments, the case is opaque. The case being opaque hides from a patient a length of the needle proximal of a distal end of the case.

In some embodiments, the IV catheter-placement device is configured for one-handed operation with respect to advancing the IV catheter and retracting the needle.

Also disclosed herein is an IV catheter-placement device including, in some embodiments, a cartridge and a case fixedly disposed over the cartridge. The cartridge includes a barrel, a needle extending from the barrel, and an IV catheter including a catheter hub slidably disposed over the needle. The barrel includes a needle cavity, a spring compressed against a distal-end portion of the needle cavity in at least an initial state of the IV catheter-placement device, and a release button on a side of the barrel configured to release the spring when the spring is compressed. The needle includes a needle hub captively disposed in the needle cavity. The needle hub compresses the spring against the distal-end portion of the needle cavity in at least the initial state of the IV catheter-placement device. The case includes a deployment button on a side of the case. The deployment button is configured to slide the IV catheter over the needle. The deployment button is also configured to press the release button when the deployment button slides into the release button. The spring compressed between the needle hub and the distal-end portion of the barrel is released when the deployment button slides into the release button. An entirety of the needle is subsequently launched into the needle cavity of the barrel for a deployed state of the IV catheter-placement device.

In some embodiments, the deployment button includes a longitudinal extension disposed between the case and the cartridge having a distal end abutting a portion of the catheter hub in at least the initial state of the IV catheter-placement device. The longitudinal extension is configured to slide the IV catheter over the needle.

In some embodiments, a length of the longitudinal extension is commensurate with at least about half a distance the IV catheter should be advanced into a vein for placement of the IV catheter into the vein.

In some embodiments, the deployment button includes a radial extension. The radial extension is configured to press the release button when the deployment button slides into the release button.

In some embodiments, the needle hub includes a step between a medial portion of the needle hub and a proximal-end portion of the needle hub. The spring is around the medial portion of the needle hub compressed between the step and the distal-end portion of the needle cavity in at least the initial state of the IV catheter-placement device.

In some embodiments, the needle hub includes a catch in a distal-end portion of the needle hub. The release button includes a radial extension disposed in the catch in at least the initial state of the IV catheter-placement device.

In some embodiments, the needle hub includes a needle-hub cavity configured for blood flashback upon establishing venous access with the needle.

In some embodiments, the case is opaque. The case being opaque hides from a patient a length of the needle proximal of a distal end of the case in at least the initial state of the IV catheter-placement device.

In some embodiments, the IV catheter-placement device is configured for one-handed operation with respect to advancing the IV catheter and retracting the needle.

Also disclosed herein is a method of an IV catheter-placement device including, in some embodiments, an obtaining step of obtaining the IV catheter-placement device. The IV catheter device includes a cartridge and a case fixedly disposed over the cartridge. The cartridge includes a barrel having a release button on a side of the barrel, a spring-loaded needle extending from a distal-end portion of the barrel, and an IV catheter including a catheter hub slidably disposed over the needle. The case includes a deployment button on a side of the case. The method also includes a piercing step of piercing a vein of a patient with the needle. The method also includes a sliding step of sliding the IV catheter over the needle and into the vein by way of the deployment button. The method also includes a button-pressing step of pressing the release button when the deployment button slides into the release button, which launches an entirety of the needle into a needle cavity of the barrel by releasing a spring compressed against a distal-end portion of the needle cavity by a needle hub of the needle.

In some embodiments, the sliding step includes sliding the IV catheter by way of a longitudinal extension of the deployment button disposed between the case and the cartridge. The longitudinal extension has a distal end abutting a portion of the catheter hub for the sliding step.

In some embodiments, the sliding step advances the IV catheter at least about half a distance the IV catheter should be advanced into the vein for placement of the IV catheter into the vein.

In some embodiments, the button-pressing step includes pressing the release button by way of a radial extension of the deployment button.

In some embodiments, the button-pressing step includes withdrawing a radial extension of the release button from a catch in a distal-end portion of the needle hub.

In some embodiments, the method further includes hiding from the patient a length of the needle proximal of a distal end of the case. The case is opaque for hiding the length of the needle.

In some embodiments, the method further includes operating the IV catheter-placement device with one hand with respect to at least advancing the IV catheter and retracting the needle.

These and other features of the concepts provided herein will become more apparent to those of skill in the art in view of the accompanying drawings and following description, which describe particular embodiments of such concepts in greater detail.

DRAWINGS

FIG. 4A illustrates an IV catheter-placement device having a case with a hinged mouth while in an initial state of the IV catheter-placement device in accordance with some embodiments.

FIG. 4B illustrates the IV catheter-placement device of FIG. 4A in a deployment state of the IV catheter-placement device in accordance with some embodiments.

DESCRIPTION

Figure 1:
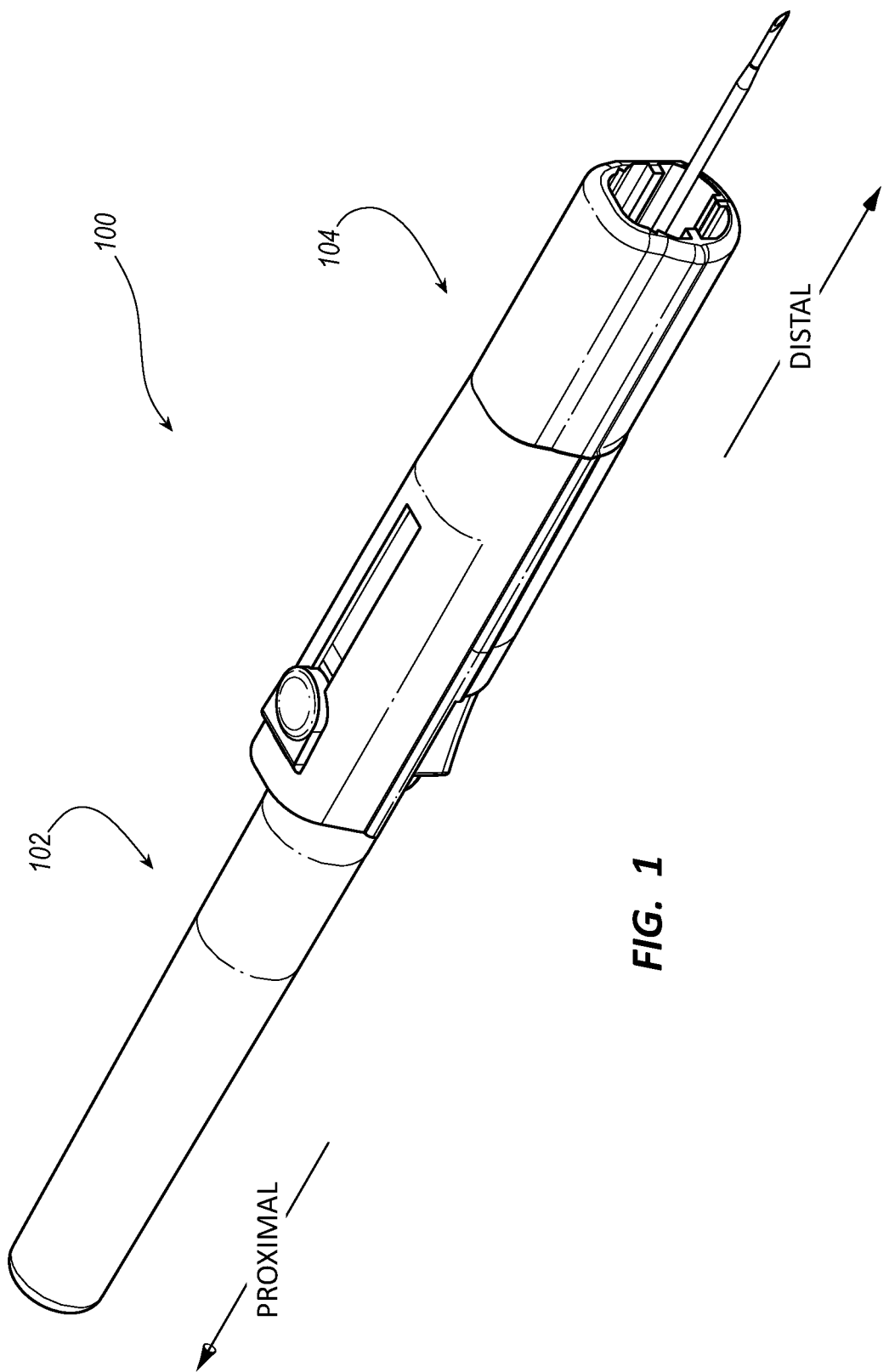
FIG. 1 illustrates an IV catheter-placement device in accordance with some embodiments.

Before some particular embodiments are disclosed in greater detail, it should be understood that the particular embodiments disclosed herein do not limit the scope of the concepts provided herein. It should also be understood that a particular embodiment disclosed herein can have features that can be readily separated from the particular embodiment and optionally combined with or substituted for features of any of a number of other embodiments disclosed herein.

Regarding terms used herein, it should also be understood the terms are for the purpose of describing some particular embodiments, and the terms do not limit the scope of the concepts provided herein. Ordinal numbers (e.g., first, second, third, etc.) are generally used to distinguish or identify different features or steps in a group of features or steps, and do not supply a serial or numerical limitation. For example, "first," "second," and "third" features or steps need not necessarily appear in that order, and the particular embodiments including such features or steps need not necessarily be limited to the three features or steps. Labels such as "left," "right," "top," "bottom," "front," "back," and the like are used for convenience and are not intended to imply, for example, any particular fixed location, orientation, or direction. Instead, such labels are used to reflect, for example, relative location, orientation, or directions. Singular forms of "a," "an," and "the" include plural references unless the context clearly dictates otherwise.

With respect to "proximal," a "proximal portion" or a "proximal end portion" of, for example, a catheter disclosed herein includes a portion of the catheter intended to be near a clinician when the catheter is used on a patient. Likewise, a "proximal length" of, for example, the catheter includes a length of the catheter intended to be near the clinician when the catheter is used on the patient. A "proximal end" of, for example, the catheter includes an end of the catheter intended to be near the clinician when the catheter is used on the patient. The proximal portion, the proximal end portion, or the proximal length of the catheter can include the proximal end of the catheter; however, the proximal portion, the proximal end portion, or the proximal length of the catheter need not include the proximal end of the catheter. That is, unless context suggests otherwise, the proximal portion, the proximal end portion, or the proximal length of the catheter is not a terminal portion or terminal length of the catheter.

With respect to "distal," a "distal portion" or a "distal-end portion" of, for example, a catheter disclosed herein includes a portion of the catheter intended to be near or in a patient when the catheter is used on the patient. Likewise, a "distal length" of, for example, the catheter includes a length of the catheter intended to be near or in the patient when the catheter is used on the patient. A "distal end" of, for example, the catheter includes an end of the catheter intended to be near or in the patient when the catheter is used on the patient. The distal portion, the distal-end portion, or the distal length of the catheter can include the distal end of the catheter; however, the distal portion, the distal-end portion, or the distal length of the catheter need not include the distal end of the catheter. That is, unless context suggests otherwise, the distal portion, the distal-end portion, or the distal length of the catheter is not a terminal portion or terminal length of the catheter.

Unless defined otherwise, all technical and scientific terms used herein have the same meaning as commonly understood by those of ordinary skill in the art.

As set forth above, the length of the needles in the existing IV catheter-placement devices can frighten patients, particularly those with a needle phobia. However, there is a need for IV catheter-placement devices with even longer needles than the existing IV catheter-placement devices, which can further frighten patients. Disclosed herein is an IV catheter-placement device and method that address the foregoing.

For example, an IV catheter-placement device includes, in some embodiments, a cartridge and a case fixedly disposed over the cartridge. The cartridge includes a barrel having a release button, a spring-loaded needle extending from the barrel, and an IV catheter including a catheter hub slidably disposed over the needle. The case includes a deployment button on a side of the case. The deployment button is configured to slide the IV catheter over the needle. The deployment button is also configured to press the release button when the deployment button slides into the release button. A spring compressed between a needle hub and a distal-end portion of the barrel is released when the deployment button slides into the release button. An entirety of the needle is subsequently launched into a needle cavity of the barrel.

Additional details of the IV catheter-placement device and method are set forth below such as how the case hides from a patient a true length of the needle by hiding a length of the needle proximal of a distal end of the case of the IV catheter-placement device.

IV Catheter-Placement Device

Figure 2:
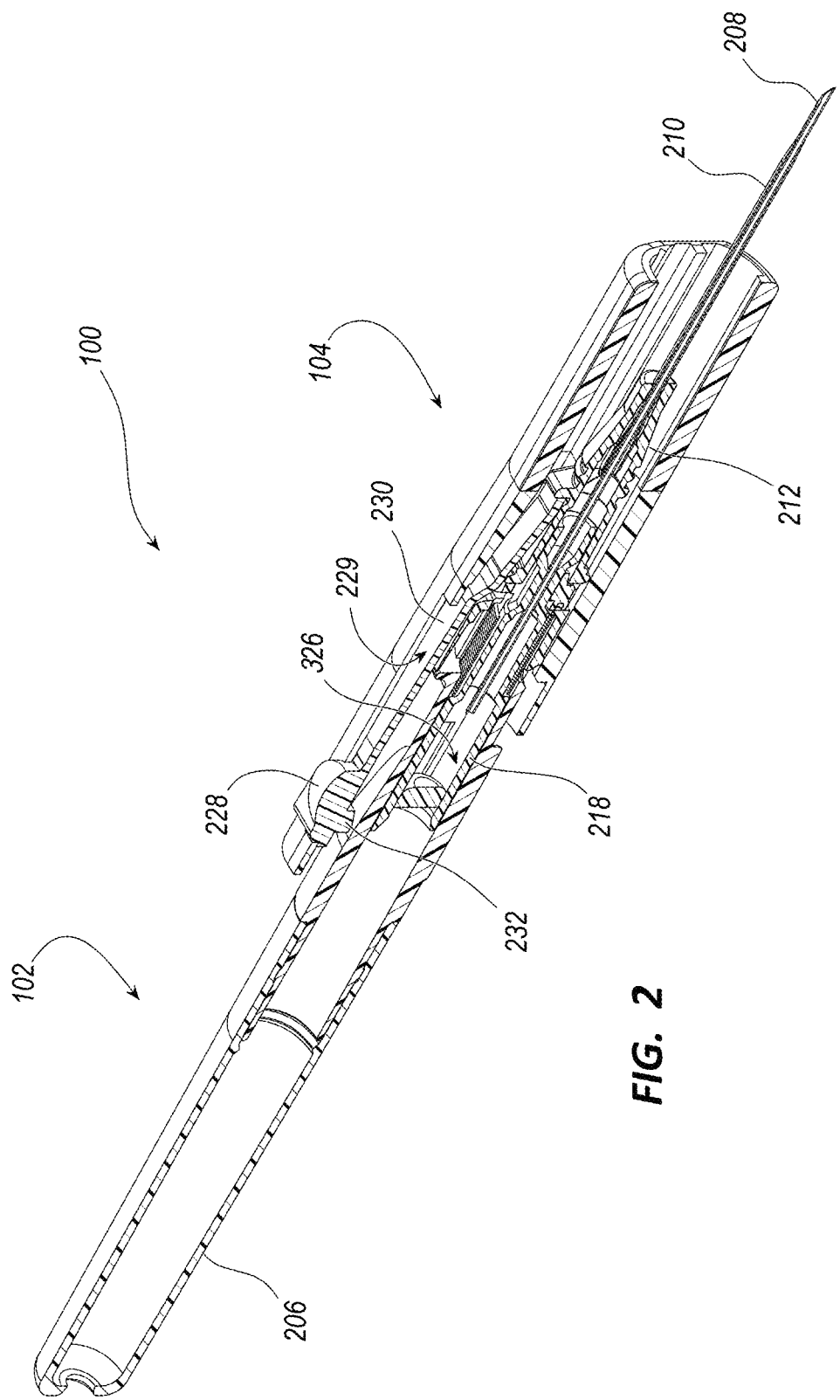
FIG. 2 illustrates a cross section of the IV catheter-placement device in accordance with some embodiments.
Figure 3A:
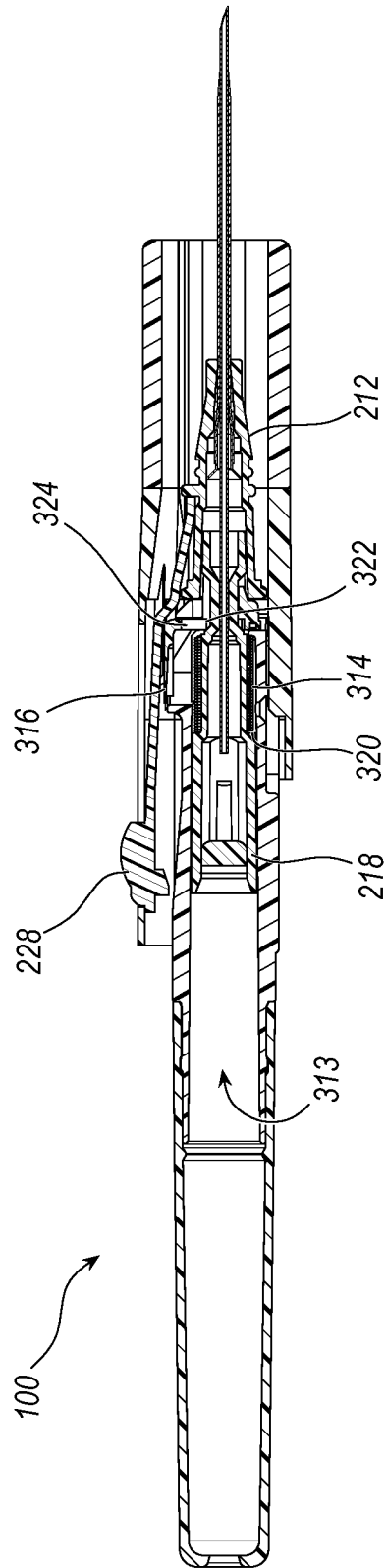
FIG. 3A illustrates a cross section of the IV catheter-placement device in an initial state of the IV catheter-placement device in accordance with some embodiments.
Figure 3B:
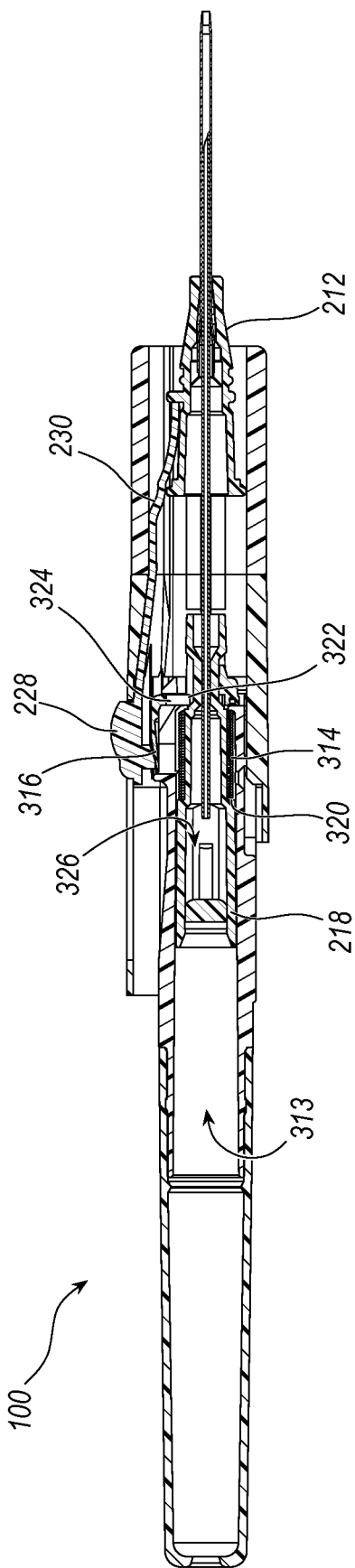
FIG. 3B illustrates a cross section of the IV catheter-placement device immediately before a deployment state of the IV catheter-placement device in accordance with some embodiments.

FIGS. 1 and 2 illustrate different views of an IV catheter-placement device 100 in accordance with some embodiments. FIGS. 3A and 3B respectively illustrate a cross section of the IV catheter-placement device 100 in an initial state of the IV catheter-placement device 100 and immediately before a deployment state of the IV catheter-placement device 100 in accordance with some embodiments. FIGS. 4A and 4B illustrate an IV catheter-placement device 400 having a case 404 with a hinged mouth 405 respectively in an initial state and a deployed state of the IV catheter-placement device in accordance with some embodiments.

As shown, the IV catheter-placement device 100 includes a cartridge 102 and a case 104 over the cartridge 102. The case 104 is configured to be fixedly disposed over the cartridge 102 such that a deployment button of the case 104 can slide an IV catheter of the cartridge 102 in a distal direction as set forth in more detail below.

The cartridge 102 includes a barrel 206, a needle 208 extending from the barrel 206, and an IV catheter 210 including a catheter hub 212 slidably disposed over the needle 208. In at least the initial state of the IV catheter-placement device 100, a tip of the needle 208 extends past a tip of the IV catheter 210 for piercing a vein of a patient with the needle 208. As set forth above, both the needle 208 and the IV catheter 210 can be longer than those of existing IV catheter-placement devices as needed for IV-catheter placement in implanted ports such as the PowerFlow™ Implantable Apheresis IV Port.

The barrel 206 includes a needle cavity 313, a spring 314 compressed against a distal-end portion of the needle cavity 313 in at least the initial state of the IV catheter-placement device 100, and a release button 316 on a side of the barrel 206 configured to release the spring 314 when the spring 314 is compressed such as in the initial state of the IV catheter-placement device 100. The barrel 206 includes a groove or channel in a side of the barrel 206 configured to provide a run for a radial extension of a deployment button on a side of the case 104, which features of the case 104 are as set forth below.

The needle 208 includes a needle hub 218, at least of portion of which is captively disposed in the needle cavity 313 of the barrel 206. The needle hub 218 is configured to compress the spring 314 against the distal-end portion of the needle cavity 313 in at least the initial state of the IV catheter-placement device 100. Indeed, the needle hub 218 includes a step 320 between a medial portion of the needle hub 218 and a proximal-end portion of the needle hub 218, wherein the medial portion of the needle hub 218 has a smaller diameter than the proximal-end portion of the needle hub 218. The spring 314 is around the medial portion of the needle hub 218 compressed between the step 320 and the distal-end portion of the needle cavity 313 in at least the initial state of the IV catheter-placement device 100.

The needle hub 218 includes a catch 322 in a distal-end portion of the needle hub 218 configured to accept a portion of the release button 316 in at least the initial state of the IV catheter-placement device 100. Indeed, the release button 316 includes a radial extension 324 disposed in the catch 322 in at least the initial state of the IV catheter-placement device 100.

The needle hub 218 includes a needle-hub cavity 326 in the proximal-end portion of the needle hub 218 configured for blood flashback upon piercing a vein of a patient with the needle 208 and establishing venous access.

The case 104 includes a deployment button 228 disposed in a longitudinal slot 229 of a side of the case 104. The deployment button 228 has at least two functions. The deployment button 228 is configured to slide along the longitudinal slot 229 and, in turn, slide the IV catheter 210 over the needle 208 for a first function of the deployment button 228. The deployment button 228 is also configured to press the release button 316 when the deployment button 228 slides into the release button 316 for a second function of the deployment button 228.

With respect to sliding the IV catheter 210 over the needle 208, the deployment button 228 includes a longitudinal extension 230 disposed between the case 104 and the cartridge 102 having a distal end abutting a portion (e.g., a tab) of the catheter hub 212 in at least the initial state of the IV catheter-placement device 100. The deployment button 228 is configured to slide the IV catheter 210 over the needle 208 by way of the longitudinal extension 230. A length of the longitudinal extension 230 or the longitudinal slot 229 of the side of the case 104 is commensurate with at least about half up to an entire distance the IV catheter 210 should be advanced into a vein for placement of the IV catheter 210 into the vein.

With respect to pressing the release button 316 when the deployment button 228 slides into the release button 316, the deployment button 228 includes a radial extension 232. The radial extension 232 is configured to press the release button 316 when the deployment button 228 slides into the release button 316. (See FIG. 3B, which illustrates the radial extension 232 pressing the release button 316.) The spring 314 compressed between the needle hub 218 and the distal-end portion of the barrel 206 is released by pivoting the radial extension 324 of the release button 316 away from the catch 322 of the needle hub 218 when the deployment button 228 slides into the release button 316. An entirety of the needle 208 is subsequently launched into the needle cavity 313 of the barrel 206 for a deployed state of the IV catheter-placement device 100.

The case 104 can be shaped as shown or include a taper from a medial section of the case 104 to a distal-end portion of the case 104. If tapered, the case 104 can include a mechanism such as the hinged mouth 405 of the case 404 configured to open and allow the catheter hub 212 therethrough when advancing the IV catheter 210. Hinges of the hinged mouth 405 are configured to open the hinged mouth 405 to the sides of the case 404 so as to not interfere with a patient. Regardless of the shape of the case, the case 104 can advantageously be opaque. The case 104 being opaque hides from a patient a true length of the needle 208 by hiding a length of the needle 208 proximal of a distal end of the case 104 in at least the initial state of the IV catheter-placement device 100. The length of the needle hidden by the case 104 can be about half the length of the needle 208, which makes it possible to increase the length of the needle 208 without frightening patients of the length of the needle 208.

Advantageously, the IV catheter-placement device 100 is configured with the deployment button 228 proximally offset from the release button 316. Because the deployment button 228 has the two functions set forth above including advancing the IV catheter 210 and retracting the needle 208, the offset allows for one-handed operation of the IV catheter-placement device 100 with respect to at least advancing the IV catheter 210 and retracting the needle 208. Indeed, the offset places the deployment button 228 in a convenient medial location of the IV catheter-placement device 100 allowing one-handed operation of the IV catheter-placement device 100 even for clinicians with smaller sized hands.

Method

A method of an IV catheter-placement device 100 includes an obtaining step of obtaining the IV catheter-placement device 100. As set forth above, the IV catheter device 100 includes the cartridge 102 and the case 104 fixedly disposed over the cartridge 102. The cartridge 102 includes the barrel 206 having the release button 316 on the side of the barrel 206, the spring-loaded needle 208 extending from the distal-end portion of the barrel 206, and the IV catheter 210 including the catheter hub 212 slidably disposed over the needle 208. The case 104 includes a deployment button 228 on the side of the case 104. The method also includes a piercing step of piercing a vein of a patient with the needle 208. The method also includes a sliding step of sliding the IV catheter 210 over the needle 208 and advancing the IV catheter 210 into the vein by way of the deployment button 228. The method also includes a button-pressing step of pressing the release button 316 when the deployment button 228 slides into the release button 316, which launches the entirety of the needle 208 into the needle cavity 313 of the barrel 206 by releasing the spring 314 compressed against the distal-end portion of the needle cavity 313 by the needle hub 218 of the needle 208.

With respect to the sliding step, the sliding step includes sliding the IV catheter 210 by way of the longitudinal extension 230 of the deployment button 228 disposed between the case 104 and the cartridge 102. The longitudinal extension 230 has the distal end thereof abutting the portion of the catheter hub 212 for the sliding step. The sliding step advances the IV catheter 210 at least about half up to an entire distance the IV catheter 210 should be advanced into the vein for placement of the IV catheter 210 into the vein.

With respect to the button-pressing step, the button-pressing step includes pressing the release button 316 by way of the radial extension 232 of the deployment button 228. The button-pressing step includes withdrawing the radial extension 324 of the release button 316 from the catch 322 in the distal-end portion of the needle hub 218.

The method further includes hiding from the patient the length of the needle 208 proximal of the distal end of the case 104. As set forth above, the case 104 is opaque for hiding the length of the needle 208.

The method further includes operating the IV catheter-placement device 100 with one hand with respect to at least advancing the IV catheter 210 and retracting the needle 208.

While some particular embodiments have been disclosed herein, and while the particular embodiments have been disclosed in some detail, it is not the intention for the particular embodiments to limit the scope of the concepts provided herein. Additional adaptations and/or modifications can appear to those of ordinary skill in the art, and, in broader aspects, these adaptations and/or modifications are encompassed as well. Accordingly, departures may be made from the particular embodiments disclosed herein without departing from the scope of the concepts provided herein.

What is claimed is:

1. An intravenous ("IV") catheter-placement device, comprising:
a cartridge including a barrel having a release button on a side of the barrel, a spring-loaded needle extending from a distal-end portion of the barrel, and an IV catheter including a catheter hub slidably disposed over the spring-loaded needle; and
a case fixedly disposed over the cartridge including a longitudinal slot in a side of the case, a deployment button configured to slide in a distal direction along the longitudinal slot and, in turn, slide the IV catheter over the spring-loaded needle and press the release button when the deployment button slides into the release button such that a spring compressed between a needle hub and the distal-end portion of the barrel is released and an entirety of the spring-loaded needle is launched into a needle cavity of the barrel.

2. The IV catheter-placement device of claim 1, wherein the deployment button includes a longitudinal extension disposed between the case and the cartridge having a distal end abutting a portion of the catheter hub configured to slide the IV catheter over the spring-loaded needle.

3. The IV catheter-placement device of claim 1, wherein the deployment button includes a radial extension configured to press the release button when the deployment button slides into the release button.

4. The IV catheter-placement device of claim 1, wherein the case is opaque, thereby hiding from a patient about half a length of the spring-loaded needle proximal of a distal end of the case.

5. The IV catheter-placement device of claim 1, wherein the IV catheter-placement device is configured for one-handed operation with respect to advancing the IV catheter and retracting the spring-loaded needle.

6. An intravenous ("IV") catheter-placement device, comprising:
a cartridge including:
a barrel including a needle cavity, a spring compressed against a distal-end portion of the needle cavity in at least an initial state of the IV catheter-placement device, and a release button on a side of the barrel configured to release the spring when the spring is compressed;

a needle extending from the barrel, the needle including a needle hub captively disposed in the needle cavity compressing the spring against the distal-end portion of the needle cavity in at least the initial state of the IV catheter-placement device; and an IV catheter including a catheter hub slidably disposed over the needle; and a case fixedly disposed over the cartridge including a longitudinal slot in a side of the case, a deployment button configured to slide in a distal direction along the longitudinal slot and, in turn, slide the IV catheter over the needle and press the release button when the deployment button slides into the release button such that the spring is released and an entirety of the needle is launched into the needle cavity for a deployed state of the IV catheter-placement device.

7. The IV catheter-placement device of claim 6, wherein the deployment button includes a longitudinal extension disposed between the case and the cartridge having a distal end abutting a portion of the catheter hub in at least the initial state of the IV catheter-placement device configured to slide the IV catheter over the needle.

8. The IV catheter-placement device of claim 7, wherein a length of the longitudinal extension is commensurate with at least about half a distance the IV catheter should be advanced into a vein for placement of the IV catheter into the vein.

9. The IV catheter-placement device of claim 6, wherein the deployment button includes a radial extension configured to press the release button when the deployment button slides into the release button.

10. The IV catheter-placement device of claim 6, wherein the needle hub includes a step between a medial portion of the needle hub and a proximal-end portion of the needle hub, the spring coiled around the medial portion of the needle hub and compressed between the step and the distal-end portion of the needle cavity in at least the initial state of the IV catheter-placement device.

11. The IV catheter-placement device of claim 6, wherein the needle hub includes a catch in a distal-end portion of the needle hub, the release button including a radial extension disposed in the catch in at least the initial state of the IV catheter-placement device.

12. The IV catheter-placement device of claim 6, wherein the needle hub includes a needle-hub cavity configured for blood flashback upon establishing venous access with the needle.

13. The IV catheter-placement device of claim 6, wherein the case is opaque, thereby hiding from a patient a length of the needle proximal of a distal end of the case in at least the initial state of the IV catheter-placement device.

14. The IV catheter-placement device of claim 6, wherein the IV catheter-placement device is configured for one-handed operation with respect to advancing the IV catheter and retracting the needle.

15. A method of using an intravenous ("IV") catheter-placement device, comprising:

obtaining the IV catheter-placement device, the IV catheter-placement device including:
a cartridge including a barrel having a release button on a side of the barrel, a spring-loaded needle extending from a distal-end portion of the barrel, and an IV catheter including a catheter hub slidably disposed over the spring-loaded needle; and
a case fixedly disposed over the cartridge including a longitudinal slot in a side of the case, a deployment button configured to slide in a distal direction along the longitudinal slot;

piercing a vein of a patient with the spring-loaded needle;

sliding the IV catheter over the needle and into the vein by way of the deployment button; and pressing the release button when the deployment button slides into the release button, thereby launching an entirety of the needle into a needle cavity of the barrel by releasing a spring compressed against a distal-end portion of the needle cavity by a needle hub of the spring-loaded needle.

16. The method of claim 15, wherein sliding the IV catheter over the spring-loaded needle includes sliding the IV catheter by way of a longitudinal extension of the deployment button disposed between the case and the cartridge having a distal end abutting a portion of the catheter hub.

17. The method of claim 15, wherein sliding the IV catheter over the spring-loaded needle advances the IV catheter at least about half a distance the IV catheter should be advanced into the vein for placement of the IV catheter into the vein.

18. The method of claim 15, wherein pressing the release button when the deployment button slides into the release button includes pressing the release button by way of a radial extension of the deployment button.

19. The method of claim 15, wherein pressing the release button when the deployment button slides into the release button includes withdrawing a radial extension of the release button from a catch in a distal-end portion of the needle hub.

20. The method of claim 15, further comprising hiding from the patient a length of the spring-loaded needle proximal of a distal end of the case, wherein the case is opaque.

21. The method of claim 15, further comprising operating the IV catheter-placement device with one hand with respect to at least advancing the IV catheter and retracting the spring-loaded needle.

* * * * *